(12) United States Patent
Kawasaki

(10) Patent No.: US 8,483,607 B2
(45) Date of Patent: Jul. 9, 2013

(54) WIRELESS COMMUNICATION METHOD AND RELAY APPARATUS

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 12/852,949

(22) Filed: Aug. 9, 2010

(65) Prior Publication Data
US 2011/0053497 A1     Mar. 3, 2011

(30) Foreign Application Priority Data
Aug. 31, 2009    (JP) ................... 2009-200223

(51) Int. Cl.
*H04B 7/15*     (2006.01)
(52) U.S. Cl.
USPC ....................... 455/11.1; 455/412.2
(58) Field of Classification Search
USPC .................. 455/7, 11.1, 13.1, 15, 16
See application file for complete search history.

(56) References Cited

U.S. PATENT DOCUMENTS
7,062,224 B2 *   6/2006   Baker et al. ........................ 455/9

FOREIGN PATENT DOCUMENTS
JP     2009-055185     3/2009

* cited by examiner

*Primary Examiner* — Tu X Nguyen
(74) *Attorney, Agent, or Firm* — Myers Wolin, LLC

(57) ABSTRACT

A wireless communication method executed by a wireless communication system including a relay apparatus, a first wireless communication apparatus, and a second wireless communication apparatus includes the following operations. Upon receiving a wireless signal from the first wireless communication apparatus, the relay apparatus adds advice information, which indicates that the wireless signal has been relayed, to the received wireless signal. The relay apparatus transmits the wireless signal added the advice information thereto to the second wireless communication apparatus. The second wireless communication apparatus detects the advice information to determine whether the wireless signal has been relayed.

8 Claims, 17 Drawing Sheets

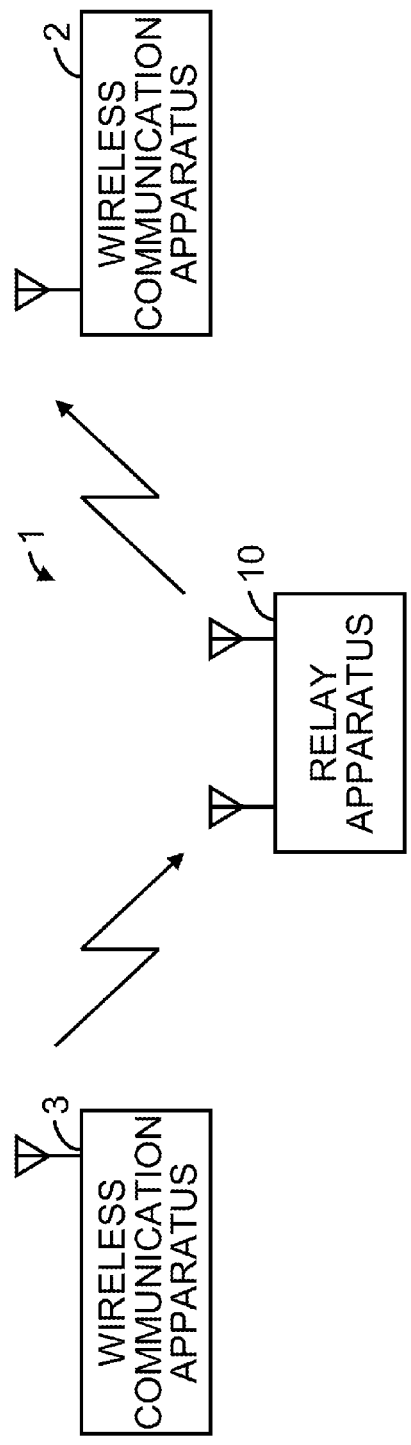
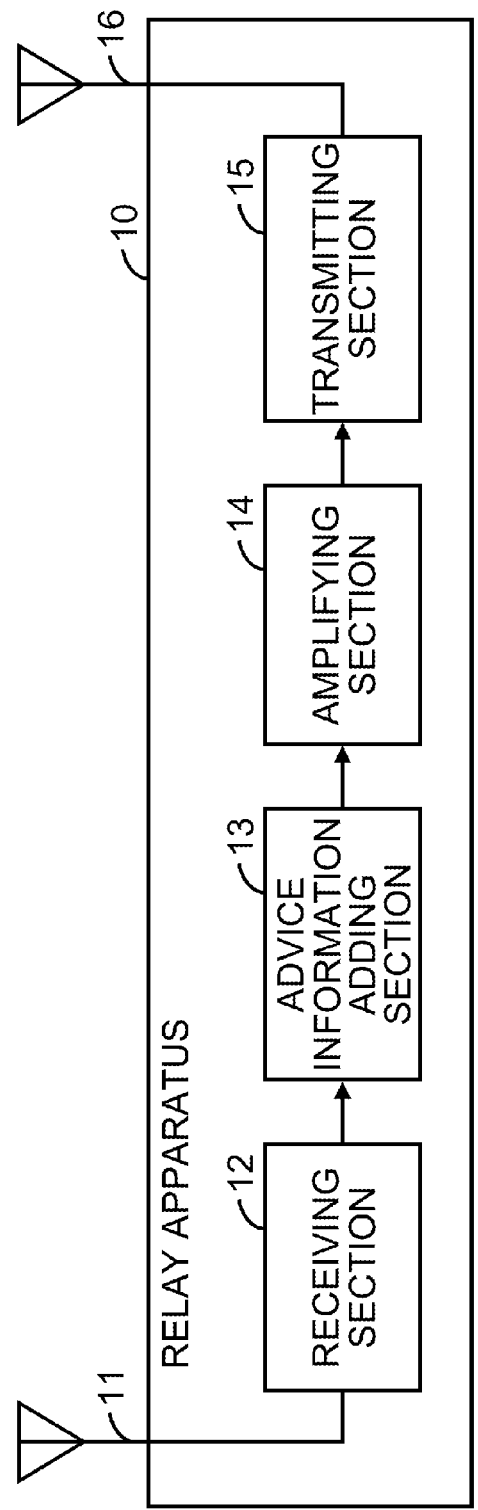

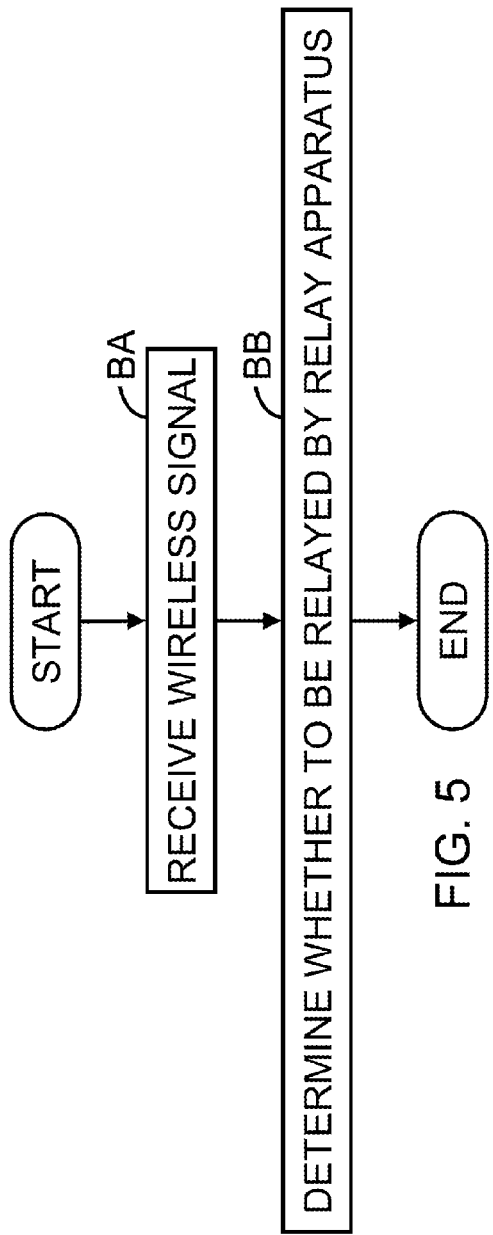
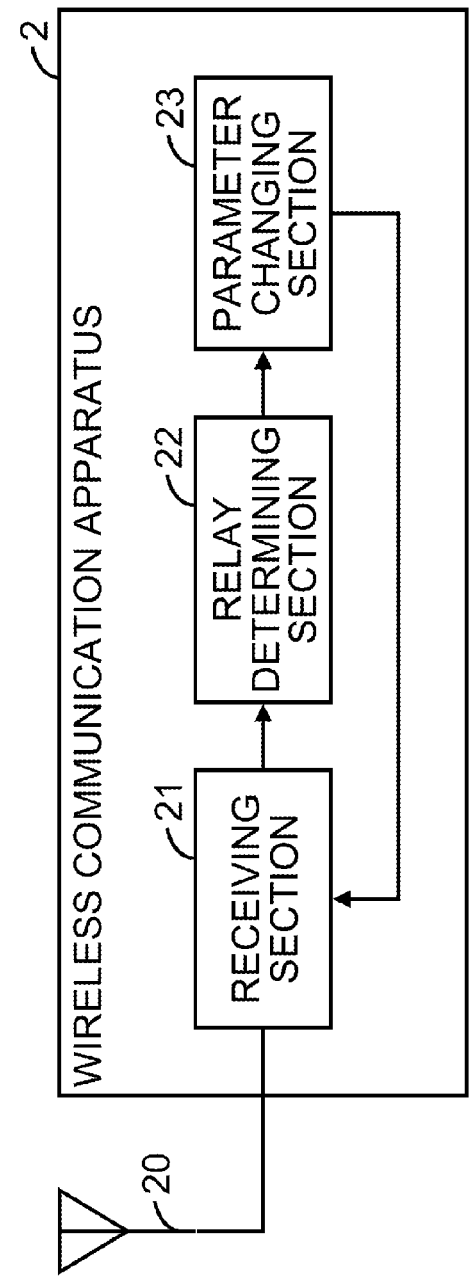

WIRELESS COMMUNICATION METHOD AND RELAY APPARATUS

CROSS-REFERENCE TO RELATED APPLICATION

This application is based upon and claims the benefit of priority of the prior Japanese Patent Application No. 2009-200223, filed on Aug. 31, 2009, the entire contents of which are incorporated herein by reference.

FIELD

Embodiments discussed herein are related to a wireless communication method and a relay apparatus for relaying a wireless signal.

BACKGROUND

In the field of wireless communication, a method of relaying a wireless signal using a relay apparatus has been put to practical use. An example of such a relay apparatus is, for example, a booster device that does not perform regenerative relay.

A wireless relay apparatus that amplifies and relays a wireless signal between a base station and a mobile station that perform closed-loop transmission power control has been proposed. The wireless relay apparatus includes a downlink relaying section, a downlink power control command obtaining section, a downlink reception status determining section, and a relay controlling section. The downlink relaying section amplifies a downlink signal transmitted from the base station and transmits the amplified downlink signal to a mobile station. The downlink power control command obtaining section obtains, from an uplink signal transmitted from the mobile station, a downlink power control command for controlling transmission power of the base station. The downlink reception status determining section determines, in accordance with the downlink power control command, whether the mobile station is in a reception status requiring amplification of the downlink signal.

The relay controlling section stops the amplification process performed by the downlink relaying section when it has been determined that the mobile station is not in a reception status requiring amplification of the downlink signal.

Japanese Laid-open Patent Publication No. 2009-55185 discloses a related technique.

SUMMARY

According to an aspect of the present invention, provided is a wireless communication method executed by a wireless communication system including a relay apparatus, a first wireless communication apparatus, and a second wireless communication apparatus. The wireless communication method includes the following operations. Upon receiving a wireless signal from the first wireless communication apparatus, the relay apparatus adds advice information, which indicates that the wireless signal has been relayed, to the received wireless signal. The relay apparatus transmits the wireless signal added the advice information thereto to the second wireless communication apparatus. The second wireless communication apparatus detects the advice information to determine whether the wireless signal has been relayed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a configuration of a communication system according to an embodiment of the present invention;

FIG. 2 is a diagram illustrating an example of a configuration of a relay apparatus according to an embodiment of the present invention;

FIG. 5 is a diagram illustrating an example of an operation flow of a process performed by a wireless communication apparatus according to an embodiment of the present invention;

FIG. 6 is a diagram illustrating an example of a configuration of a wireless communication apparatus according to an embodiment of the present invention;

DESCRIPTION OF EMBODIMENTS

Figure 3:
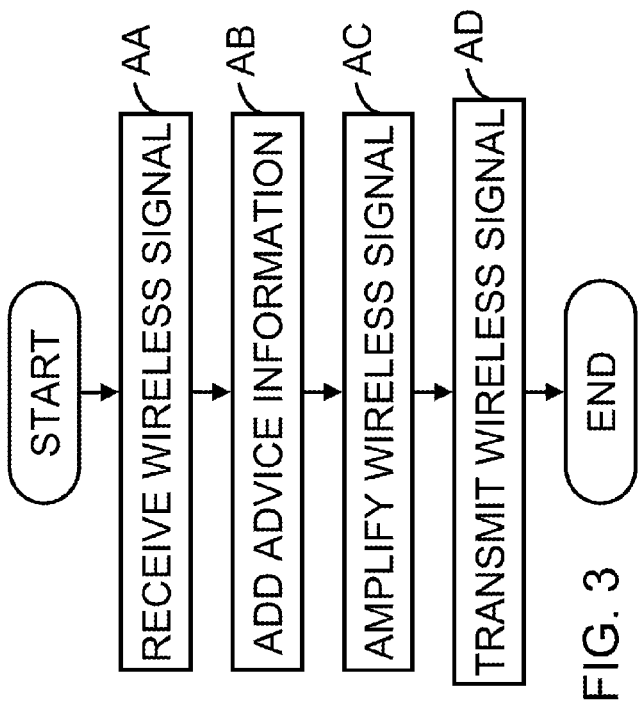
FIG. 3 is a diagram illustrating an example of an operation flow of a process performed by a relay apparatus according to an embodiment of the present invention.

A wireless communication apparatus may preferably perform processing in accordance with whether a wireless signal has been relayed. For example, the settings of a communication parameter used for transmitting a wireless signal may preferably be changed in accordance with whether the wireless signal has been relayed. Examples of such a communication parameter include a parameter for determining a communication method, i.e., whether to use Multiple Input Multiple Output (MIMO) transmission, or a parameter for transmission power.

For example, in a status where the wireless signal has been relayed by a relay apparatus, a keyhole effect occurs to the transmission signal. Therefore, MIMO transmission may not be performed. In a communication system where transmission power control is performed, a relay apparatus may receive a signal whose transmission power after being relayed exceeds an allowable transmission power of the relay apparatus.

As another example of the case where it is preferable to perform processing in accordance with whether the signal has been relayed, there is a positioning system that receives positioning signals from multiple positioning signal transmitting apparatuses to perform positioning in accordance with a delay time of each positioning signal. When the positioning signals are relayed, the positioning accuracy may be degraded.

According to the embodiments of the present invention, the wireless communication apparatus may change its processing in accordance with whether the wireless signal has been relayed.

Hereinafter, embodiments of the present invention will be discussed with reference to the accompanying drawings. FIG. 1 illustrates an example of a configuration of a communication system 1 according to the present embodiment. The communication system 1 includes wireless communication apparatuses 2 and 3, and a relay apparatus 10.

The relay apparatus 10 relays a wireless signal transmitted from the wireless communication apparatus 3 to the wireless communication apparatus 2. That is, the relay apparatus 10 amplifies the wireless signal received from the wireless communication apparatus 3 and transmits the amplified wireless signal. The wireless communication apparatus 2 receives the wireless signal transmitted from the relay apparatus 10.

FIG. 2 illustrates an example of a configuration of the relay apparatus 10 illustrated in FIG. 1.

The relay apparatus 10 includes antennas 11 and 16, a receiving section 12, an advice information adding section 13, an amplifying section 14, and a transmitting section 15. The receiving section 12 receives an incoming wireless signal via the antenna 11. The amplifying section 14 amplifies the received wireless signal, which has been received by the receiving section 12. The transmitting section 15 transmits the received wireless signal, which has been amplified by the amplifying section 14, via the antenna 16.

The advice information adding section 13 adds, to the signal transmitted by the transmitting section 15, information indicating that this signal has been relayed by a relay apparatus. In order to simplify the discussion, the information added to the wireless signal to indicate that this wireless signal has been relayed by a relay apparatus is referred to as "advice information". The advice information adding section 13 may add advice information to the signal before amplified by the amplifying section 14, or may add advice information to the signal after amplified by the amplifying section 14.

FIG. 3 illustrates an example of an operation flow of a process performed by the relay apparatus 10 illustrated in FIG. 2.

In operation AA, the receiving section 12 receives an incoming wireless signal via the antenna 11.

In operation AB, the advice information adding section 13 adds advice information to the received wireless signal.

In operation AC, the amplifying section 14 amplifies the received wireless signal which has been added the advice information thereto. Alternatively, operation AB may be performed after operation AC. That is, the advice information adding section 13 may add advice information to the received wireless signal after amplified by the amplifying section 14.

In operation AD, the transmitting section 15 transmits the signal, which has been added the additional information thereto and amplified by the amplifying section 14, via the antenna 16.

According to the present embodiment, advice information, that is, information indicating that the wireless signal has been relayed by a relay apparatus, may be added to the wireless signal relayed by the relay apparatus 10. Therefore, the wireless communication apparatus 2 which has received the wireless signal may determine whether the received wireless signal has been relayed by a relay apparatus.

Figure 4:
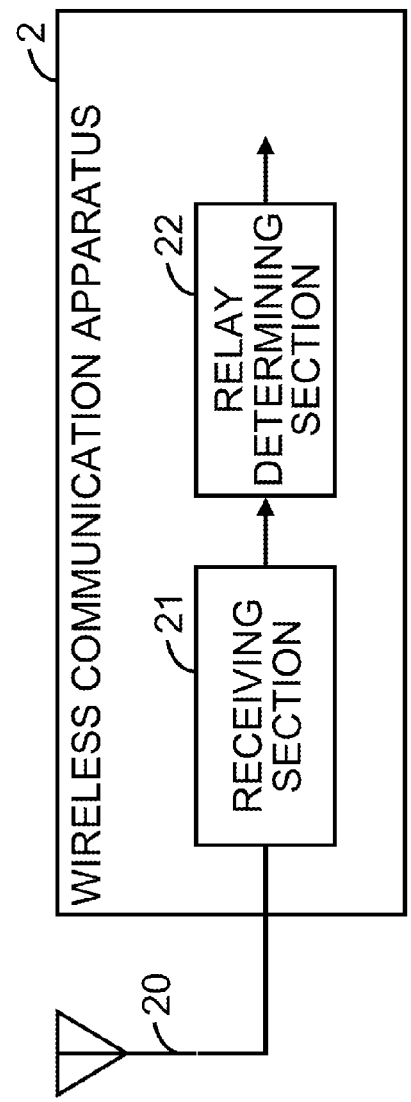
FIG. 4 is a diagram illustrating an example of a configuration of a wireless communication apparatus according to an embodiment of the present invention.

FIG. 4 illustrates a first example of a configuration of the wireless communication apparatus 2 illustrated in FIG. 1. The wireless communication apparatus 2 illustrated in FIG. 4 includes an antenna 20, a receiving section 21, and a relay determining section 22.

The receiving section 21 receives an incoming wireless signal via the antenna 20. The relay determining section 22 detects advice information from the received wireless signal to determine whether the received wireless signal received by the receiving section 21 has been relayed by a relay apparatus. The relay determining section 22 outputs a determination result signal indicating the result of the determination.

FIG. 5 illustrates an example of an operation flow of a process performed by the wireless communication apparatus 2 illustrated in FIG. 4.

In operation BA, the receiving section 21 receives an incoming wireless signal via the antenna 20.

In operation BB, the relay determining section 22 detects advice information from the received wireless signal to determine whether the received wireless signal received in operation BA has been relayed by a relay apparatus.

According to the present embodiment, the wireless communication apparatus 2 determines whether the received wireless signal has been relayed. Thus, the wireless communication apparatus 2 may use the result of the determination in a certain process performed by the wireless communication apparatus 2.

FIG. 6 illustrates a second example of a configuration of the wireless communication apparatus 2 illustrated in FIG. 1. The difference from the first example illustrated in FIG. 4 is that the wireless communication apparatus 2 illustrated in FIG. 6 further includes a parameter changing section 23.

The wireless communication apparatus 2 includes an antenna 20, a receiving section 21, a relay determining section 22, and the parameter changing section 23. The parameter changing section 23 changes a communication parameter for wireless communication between the wireless communication apparatus 3, which is the transmission source of the received wireless signal, and the wireless communication apparatus 2 in accordance with whether the received wireless signal has been relayed. The receiving section 21 and the relay determining section 22 are similar to those illustrated in FIG. 4.

The communication parameter may be, for example, a parameter for determining whether to use MIMO transmission between the wireless communication apparatuses 2 and 3. Alternatively, the communication parameter may be a parameter for transmission power to transmit the wireless signal. In the following discussion, as examples of communication parameters to be changed, a parameter for determining whether to use MIMO transmission and a parameter indicating the strength of transmission power are exemplified. However, the following discussion does not intend to restrict the type of communication parameter to be changed in accordance with whether the received wireless signal has been relayed to these exemplary parameters. As the communication parameter to be changed in accordance with whether the received wireless signal has been relayed, any type of communication parameter may be used as long as the communication parameter is meaningful to be changed in accordance with whether the received wireless signal has been relayed.

When the received wireless signal is not a relayed signal, the parameter changing section 23 uses, as the communication parameter for wireless communication between the wireless communication apparatus 3, which is the transmission source of the received wireless signal, and the wireless communication apparatus 2, a parameter used when the wireless communication apparatuses 2 and 3 directly communicate with each other. For example, the parameter changing section 23 may determine whether to use MIMO transmission in accordance with the channel quality between the wireless communication apparatuses 2 and 3. Also, for example, the parameter changing section 23 may determine transmission power in accordance with the channel quality between the wireless communication apparatuses 2 and 3.

When the received wireless signal is a relayed signal, the parameter changing section 23 uses, as the communication parameter for wireless communication between the wireless communication apparatuses 2 and 3, a parameter used when communication between the wireless communication apparatuses 2 and 3 is relayed. For example, the parameter changing section 23 may determine not to perform MIMO transmission between the wireless communication apparatuses 2 and 3. Also, for example, the parameter changing section 23 may determine the strength of transmission power to be a certain upper limit when defining the strength of transmission power in transmitting the signal from the wireless communication apparatus 3 and/or the wireless communication apparatus 2 in accordance with the channel quality between the wireless communication apparatuses 2 and 3.

The communication parameter to be changed by the parameter changing section 23 may be a communication parameter for wireless communication in which the wireless signal is transmitted from the wireless communication apparatus 2 to the wireless communication apparatus 3. Alternatively, the communication parameter to be changed by the parameter changing section 23 may be a communication parameter for wireless communication in which the wireless signal is transmitted from the wireless communication apparatus 3 to the wireless communication apparatus 2.

Figure 7:
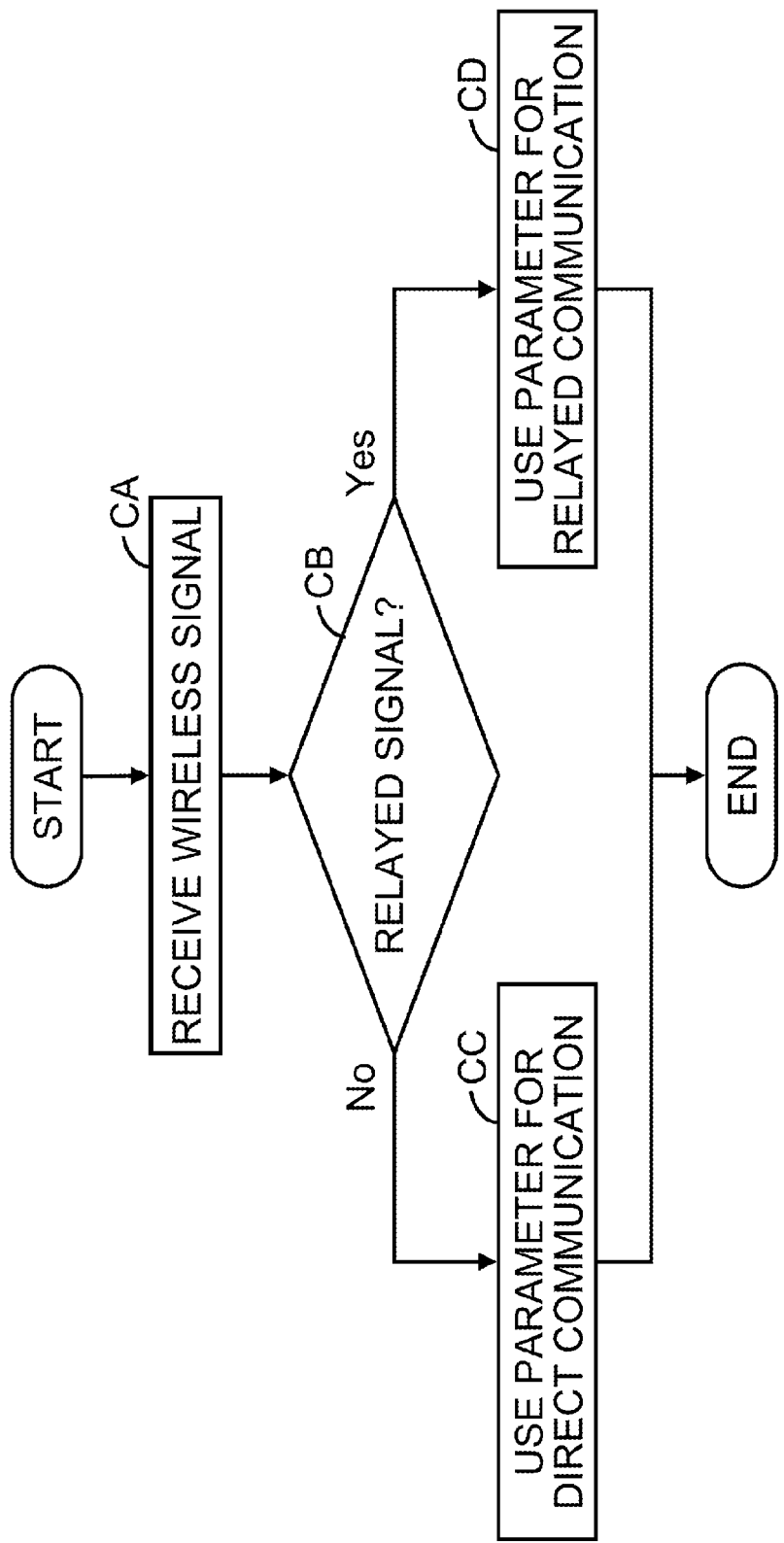
FIG. 7 is a diagram illustrating an example of an operation flow of a process performed by a wireless communication apparatus according to an embodiment of the present invention.

FIG. 7 illustrates an example of an operation flow of a process performed by the wireless communication apparatus 2 illustrated in FIG. 6.

In operation CA, the receiving section 21 receives an incoming wireless signal via the antenna 20.

In operation CB, the relay determining section 22 determines whether the received wireless signal received in operation CA is a relayed signal. When the received wireless signal is not a relayed signal ("No" in operation CB), the wireless communication apparatus 2 advances the process to operation CC. When the received wireless signal is a relayed signal ("Yes" in operation CB), the wireless communication apparatus 2 advances the process to operation CD.

In operation CC, the parameter changing section 23 uses, as the communication parameter for wireless communication between the wireless communication apparatus 3 and the wireless communication apparatus 2, a parameter used when the wireless communication apparatuses 2 and 3 directly communicate with each other. Thereafter, the wireless communication apparatus 2 terminates the process.

In operation CD, the parameter changing section 23 uses, as the communication parameter for wireless communication between the wireless communication apparatus 3 and the wireless communication apparatus 2, a parameter used when communication between the wireless communication apparatuses 2 and 3 is relayed. Thereafter, he wireless communication apparatus 2 terminates the process.

According to the present embodiment, the communication parameter used in wireless communication between the wireless communication apparatus 2 and the wireless communication apparatus 3, which is the transmission source of the received wireless signal received by the wireless communication apparatus 2, may be changed in accordance with whether the received wireless signal has been relayed. Accordingly, for example, when wireless communication between the wireless communication apparatuses 2 and 3 is relayed, communication based on MIMO transmission may be prohibited. Also, when wireless communication between the wireless communication apparatuses 2 and 3 is relayed, the strength of transmission power in transmitting the signal from each of the wireless communication apparatuses 2 and 3 may be restricted so that transmission power of the relay apparatus does not exceed the allowable transmission power.

Figure 8:
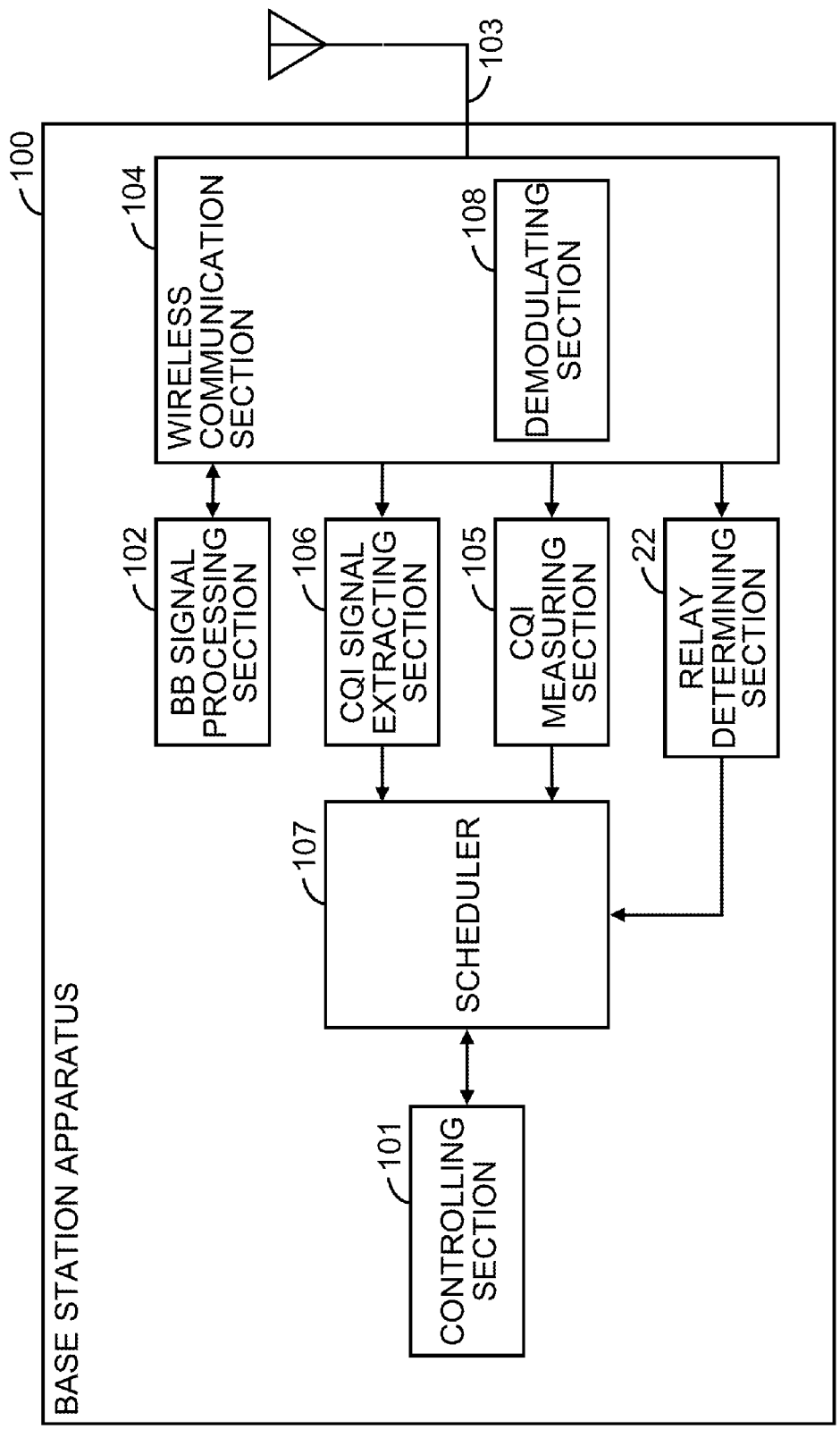
FIG. 8 is a diagram illustrating an example of a configuration of a base station apparatus serving as a wireless communication apparatus according to an embodiment of the present invention.

FIG. 8 illustrates an example of a configuration of a base station apparatus serving as the wireless communication apparatus 2 illustrated in FIG. 6.

The base station apparatus 100 includes a controlling section 101, a baseband signal (BB signal) processing section 102, an antenna 103, and a wireless communication section 104. The base station apparatus 100 further includes a channel quality indicator (CQI) measuring section 105, a CQI signal extracting section 106, a scheduler 107, and the relay determining section 22. The wireless communication section 104 includes a demodulating section 108. The scheduler 107 is given as an example of the parameter changing section 23.

The controlling section 101 controls operations of the base station apparatus 100. The controlling section 101 gives, to the scheduler 107, various setting values used in scheduling for communication between the base station apparatus 100 and a mobile station apparatus. The controlling section 101 controls operations of the base station apparatus 100 in accordance with the schedule made by the scheduler 107.

The baseband signal processing section 102 performs signal processing of a baseband signal for user data and control information transmitted between the base station apparatus 100 and the mobile station apparatus. The wireless communication section 104 transmits and receives user data and control information to/from the mobile station apparatus via the antenna 103. The demodulating section 108 demodulates the received wireless signal received from the mobile station apparatus.

The CQI measuring section 105 measures the channel quality of an uplink channel from the mobile station apparatus to the base station apparatus 100 in accordance with the signal received by the wireless communication section 104. The CQI signal extracting section 106 extracts, from the signal transmitted from the mobile station apparatus, a CQI signal indicating the channel quality of a downlink channel measured by the mobile station apparatus.

The scheduler 107 may generate a transmission power control signal for controlling transmission power of the uplink channel in accordance with the channel quality of the uplink channel, which has been measured by the CQI measuring section 105. The wireless communication section 104 transmits the transmission power control signal to the mobile station apparatus to control transmission power of the uplink channel.

The scheduler 107 determines transmission power of the downlink channel in accordance with the CQI signal transmitted from the mobile station apparatus. The scheduler 107 determines whether to perform MIMO transmission with the mobile station apparatus, in accordance with the channel quality of the downlink channel and/or the uplink channel.

The relay determining section 22 determines whether the received wireless signal received from the mobile station apparatus has been relayed. The relay determining section 22 outputs a determination result signal indicating the result of the determination to the scheduler 107. When the received wireless signal received from the mobile station apparatus is a relayed signal, the scheduler 107 may control transmission power of the mobile station apparatus by using the transmission power control signal so that transmission power of the mobile station apparatus in the uplink channel does not exceed a certain upper limit.

Also, when the received wireless signal received from the mobile station apparatus is a relayed signal, the scheduler 107 may restrict transmission power of the base station apparatus 100 to be a certain upper limit or less, assuming that wireless communication in the downlink is similarly relayed. When the received wireless signal received from the mobile station apparatus is a relayed signal, the scheduler 107 may determine not to perform MIMO transmission with the mobile station apparatus.

According to the present embodiment, the communication parameter used in uplink and/or downlink communication between the base station apparatus 100 and the mobile station apparatus may be changed in accordance with whether the received wireless signal received by the base station apparatus 100 has been relayed.

Figure 9:
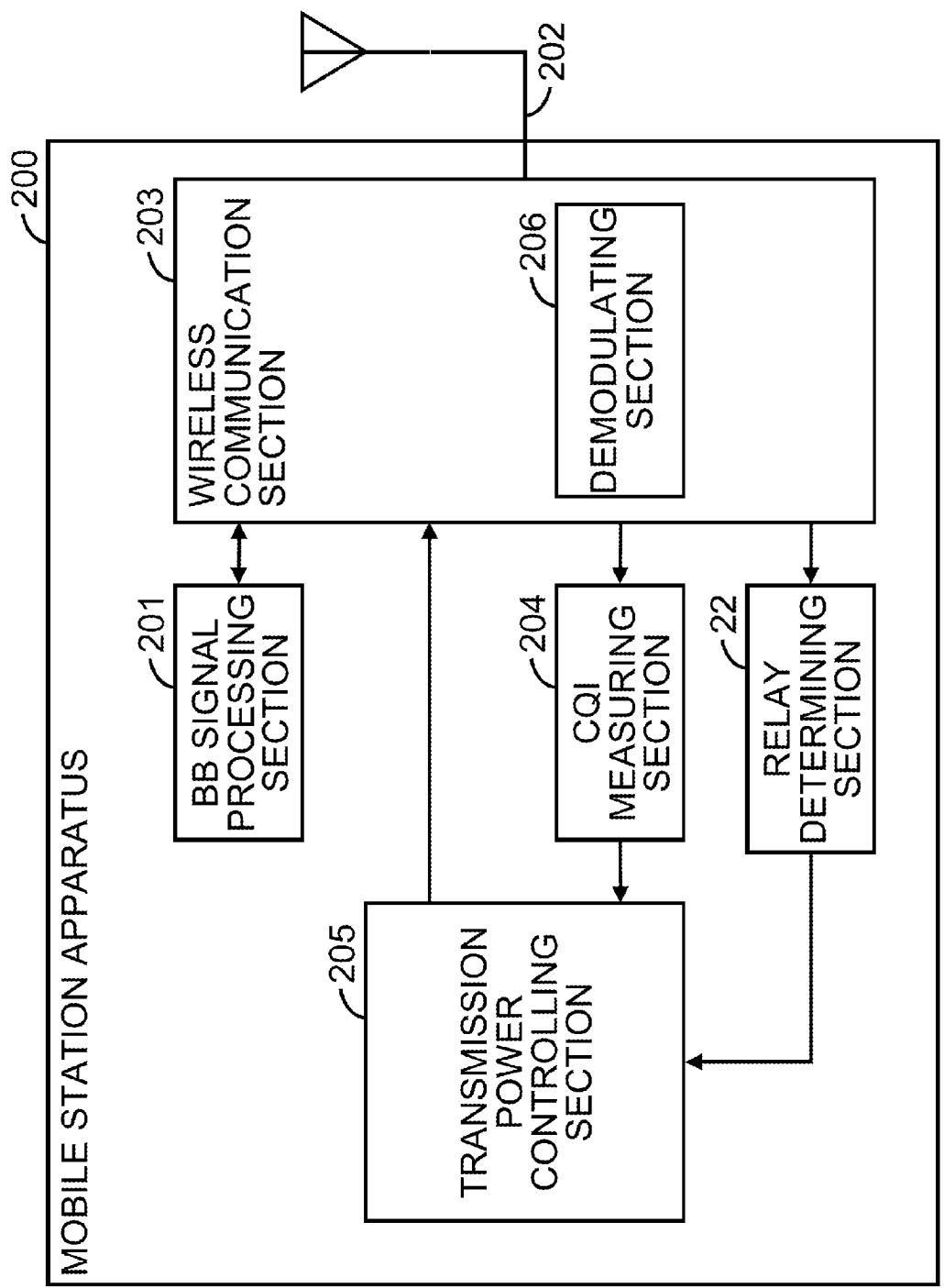
FIG. 9 is a diagram illustrating an example of a configuration of a mobile station apparatus serving as a wireless communication apparatus according to an embodiment of the present invention.

FIG. 9 illustrates a first example of a configuration of a mobile station apparatus serving as the wireless communication apparatus 2 illustrated in FIG. 6.

The mobile station apparatus 200 includes a baseband signal processing section 201, an antenna 202, a wireless communication section 203, a CQI measuring section 204, a transmission power controlling section 205, and the relay determining section 22. The wireless communication section 203 includes a demodulating section 206. The transmission power controlling section 205 is given as an example of the parameter changing section 23.

The baseband signal processing section 201 performs signal processing of a baseband signal for user data and control information transmitted between the mobile station apparatus 200 and a base station apparatus. The wireless communication section 203 transmits and receives user data and control information to/from the base station apparatus via the antenna 202. The demodulating section 206 demodulates the received wireless signal received from the base station apparatus.

The CQI measuring section 204 measures the channel quality of the downlink channel from the base station apparatus to the mobile station apparatus 200 in accordance with the signal received by the wireless communication section 203. The transmission power controlling section 205 may generate the transmission power control signal for controlling transmission power of the downlink channel in accordance with the channel quality of the downlink channel, which has been measured by the CQI measuring section 204. The wireless communication section 203 transmits the transmission power control signal to the base station apparatus to control transmission power of the downlink channel.

The relay determining section 22 determines whether the received wireless signal received from the base station apparatus has been relayed. The relay determining section 22 outputs the determination result signal indicating the result of the determination to the transmission power controlling section 205. When the received wireless signal received from the base station apparatus is a relayed signal, the transmission power controlling section 205 may control transmission power of the base station apparatus by using the transmission power control signal so that transmission power of the base station apparatus in the downlink channel does not exceed a certain upper limit.

According to the present embodiment, the strength of transmission power in transmitting the signal from the base station apparatus using the downlink channel may be controlled in accordance with whether the received wireless signal received by the mobile station apparatus 200 has been relayed.

Figure 10:
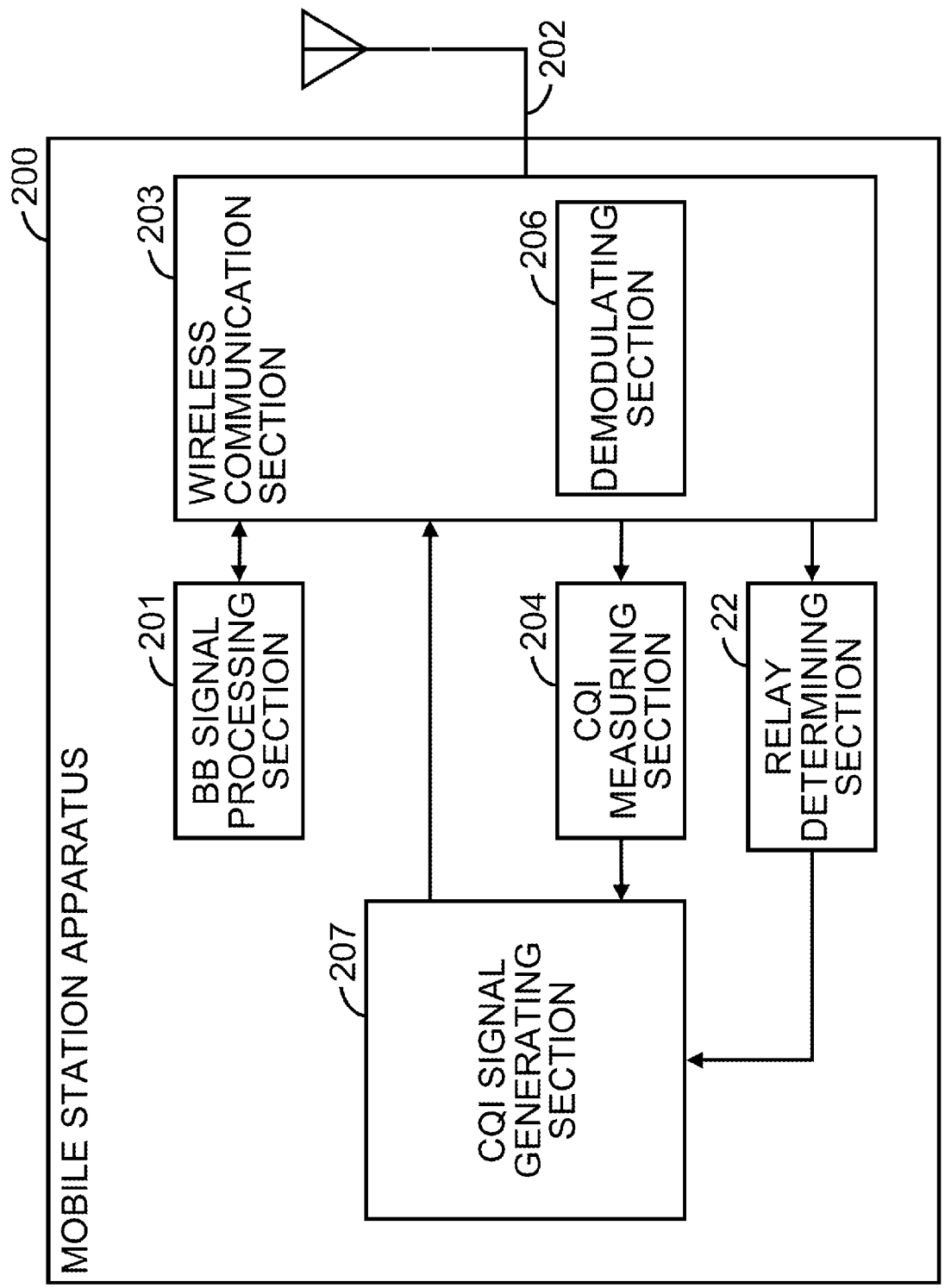
FIG. 10 is a diagram illustrating an example of a configuration of a mobile station apparatus serving as a wireless communication apparatus according to an embodiment of the present invention.

FIG. 10 illustrates a second example of a configuration of a mobile station apparatus serving as the wireless communication apparatus 2 illustrated in FIG. 6. The difference from the first example illustrated in FIG. 9 is that the mobile station apparatus 200 illustrated in FIG. 10 includes a CQI signal generating section 207 instead of the transmission power controlling section 205.

The mobile station apparatus 200 includes the baseband signal processing section 201, the antenna 202, the wireless communication section 203, the CQI measuring section 204, the CQI signal generating section 207, and the relay determining section 22. The wireless communication section 203 includes a demodulating section 206. The CQI signal generating section 207 is given as an example of the parameter changing section 23.

The CQI signal generating section 207 generates the CQI signal indicating the channel quality of the downlink channel, which has been measured by the CQI measuring section 204.

The wireless communication section 203 transmits the CQI signal to the base station apparatus, and the base station apparatus controls transmission power in the downlink channel in accordance with the CQI signal.

The relay determining section 22 may output the determination result signal indicating the result of the determination to the CQI signal generating section 207. When the received wireless signal received from the base station apparatus is a relayed signal, the CQI signal generating section 207 restricts the value of the CQI signal transmitted to the base station apparatus so that the value of the CQI signal does not exceed a certain upper limit.

According to the present embodiment, the strength of transmission power in transmitting the signal from the base station apparatus using the downlink channel may be controlled in accordance with whether the received wireless signal received by the mobile station apparatus 200 has been relayed.

Figure 11:
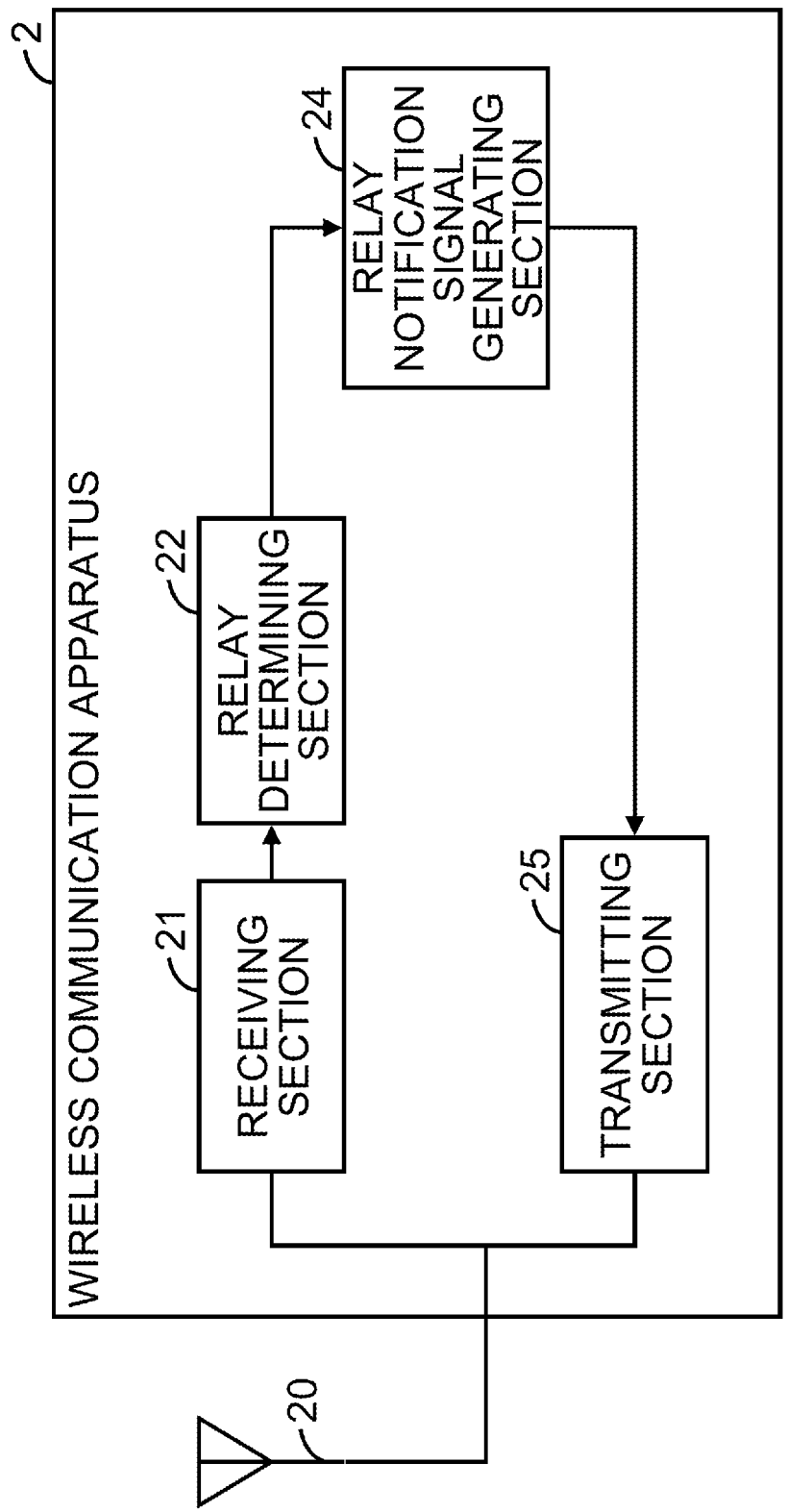
FIG. 11 is a diagram illustrating an example of a configuration of a wireless communication apparatus according to an embodiment of the present invention.

FIG. 11 illustrates a third example of a configuration of the wireless communication apparatus 2 illustrated in FIG. 1. The difference from the first example illustrated in FIG. 4 is that the wireless communication apparatus 2 illustrated in FIG. 11 further includes a relay notification signal generating section 24, and a transmitting section 25. The wireless communication apparatus 2 includes the antenna 20, the receiving section 21, the relay determining section 22, the relay notification signal generating section 24, and the transmitting section 25.

The relay notification signal generating section 24 generates a relay notification signal indicating that the wireless signal received from the wireless communication apparatus 3 has been relayed, in accordance with the determination result signal output from the relay determining section 22. The transmitting section 25 transmits the relay notification signal generated by the relay notification signal generating section 24 to the wireless communication apparatus 3, which is the transmission source of the received wireless signal.

Figure 12:
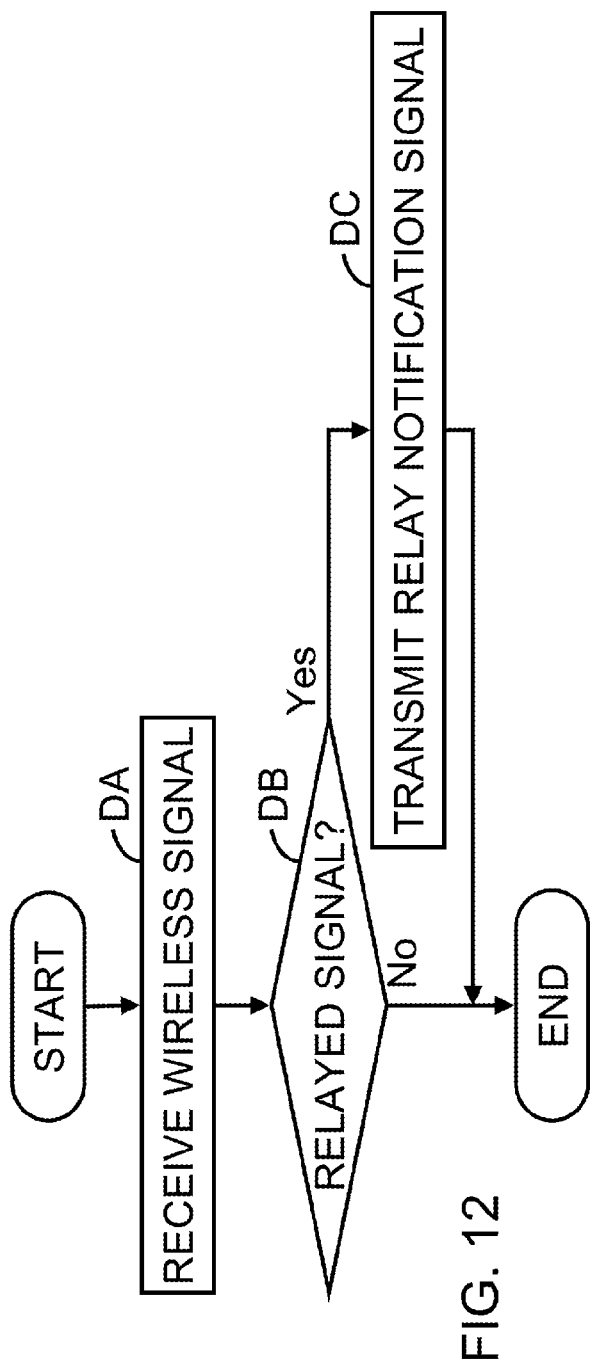
FIG. 12 is a diagram illustrating an example of an operation flow of a process performed by a wireless communication apparatus according to an embodiment of the present invention.

FIG. 12 illustrates an example of an operation flow of a process performed by the wireless communication apparatus 2 illustrated in FIG. 11.

In operation DA, the receiving section 21 receives an incoming wireless signal via the antenna 20.

In operation DB, the relay determining section 22 determines whether the received wireless signal is a relayed signal. When the received wireless signal is not a relayed signal ("No" in operation DB), the wireless communication apparatus 2 terminates the process.

In operation DC, when the received wireless signal is a relayed signal ("Yes" in operation DB), the relay notification signal generating section 24 generates the relay notification signal. The transmitting section 25 transmits the relay notification signal to the wireless communication apparatus 3, which is the transmission source of the received wireless signal.

According to the present embodiment, the wireless communication apparatus 2 may notify the wireless communication apparatus 3, which is the transmission source of the received wireless signal, of the fact that the wireless signal received from the wireless communication apparatus 3 has been relayed. Therefore, for example, the wireless communication apparatus 2 at the receiving side may detect whether communication from the wireless communication apparatus 3 to the wireless communication apparatus 2 has been relayed, and the wireless communication apparatus 3 at the transmitting side may change a communication parameter used in communication from the wireless communication apparatus 3 to the wireless communication apparatus 2.

Figure 13:
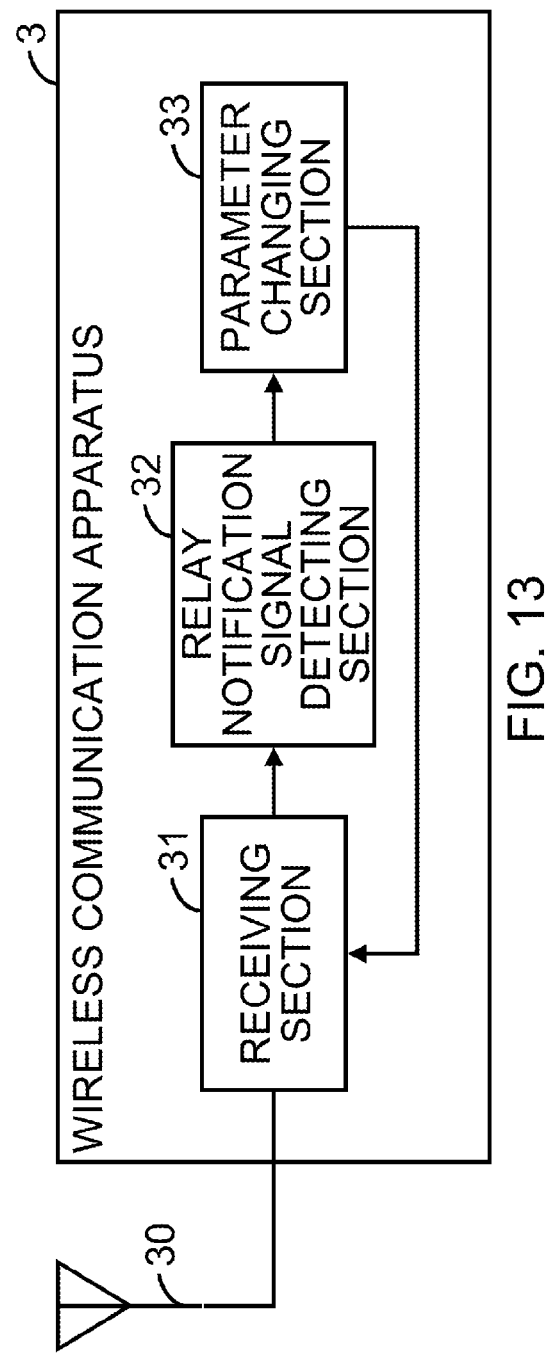
FIG. 13 is a diagram illustrating an example of a configuration of a wireless communication apparatus according to an embodiment of the present invention.

FIG. 13 illustrates an example of a configuration of the wireless communication apparatus 3 illustrated in FIG. 1. The wireless communication apparatus 3 may receive the relay notification signal transmitted from the wireless communication apparatus 2 illustrated in FIG. 11.

The wireless communication apparatus 3 includes an antenna 30, a receiving section 31, a relay notification signal detecting section 32, and a parameter changing section 33. The receiving section 31 receives an incoming wireless signal via the antenna 30. The relay notification signal detecting section 32 detects, from the received wireless signal, the relay notification signal transmitted from the wireless communication apparatus 2. The parameter changing section 33 changes the communication parameter for wireless communication between the wireless communication apparatus 2, which is the transmission source of the relay notification signal, and the wireless communication apparatus 3 in accordance with whether the relay notification signal has been detected.

As the communication parameter to be changed by the parameter changing section 33, any type of communication parameter may be used as long as the communication parameter is meaningful to be changed in accordance with whether the received wireless signal has been relayed. For example, as in the foregoing examples, communication parameters to be changed by the parameter changing section 33 may include a parameter for determining whether to use MIMO transmission and a parameter indicating the strength of transmission power.

When no relay notification signal has been detected, the parameter changing section 33 uses, as in the foregoing discussion, a parameter used when the wireless communication apparatuses 2 and 3 directly communicate with each other as the communication parameter for wireless communication between the wireless communication apparatuses 2 and 3. When the relay notification signal has been detected, the parameter changing section 33 uses, as in the foregoing discussion, the parameter used when communication between the wireless communication apparatuses 2 and 3 is relayed as the communication parameter between the wireless communication apparatus 2, which is the transmission source of the relay notification signal, and the wireless communication apparatus 3.

The communication parameter to be changed by the parameter changing section 33 may be a communication parameter for wireless communication in which the wireless signal is transmitted from the wireless communication apparatus 2 to the wireless communication apparatus 3. Alternatively, the communication parameter to be changed by the parameter changing section 33 may be a communication parameter for wireless communication in which the wireless signal is transmitted from the wireless communication apparatus 3 to the wireless communication apparatus 2.

Figure 14:
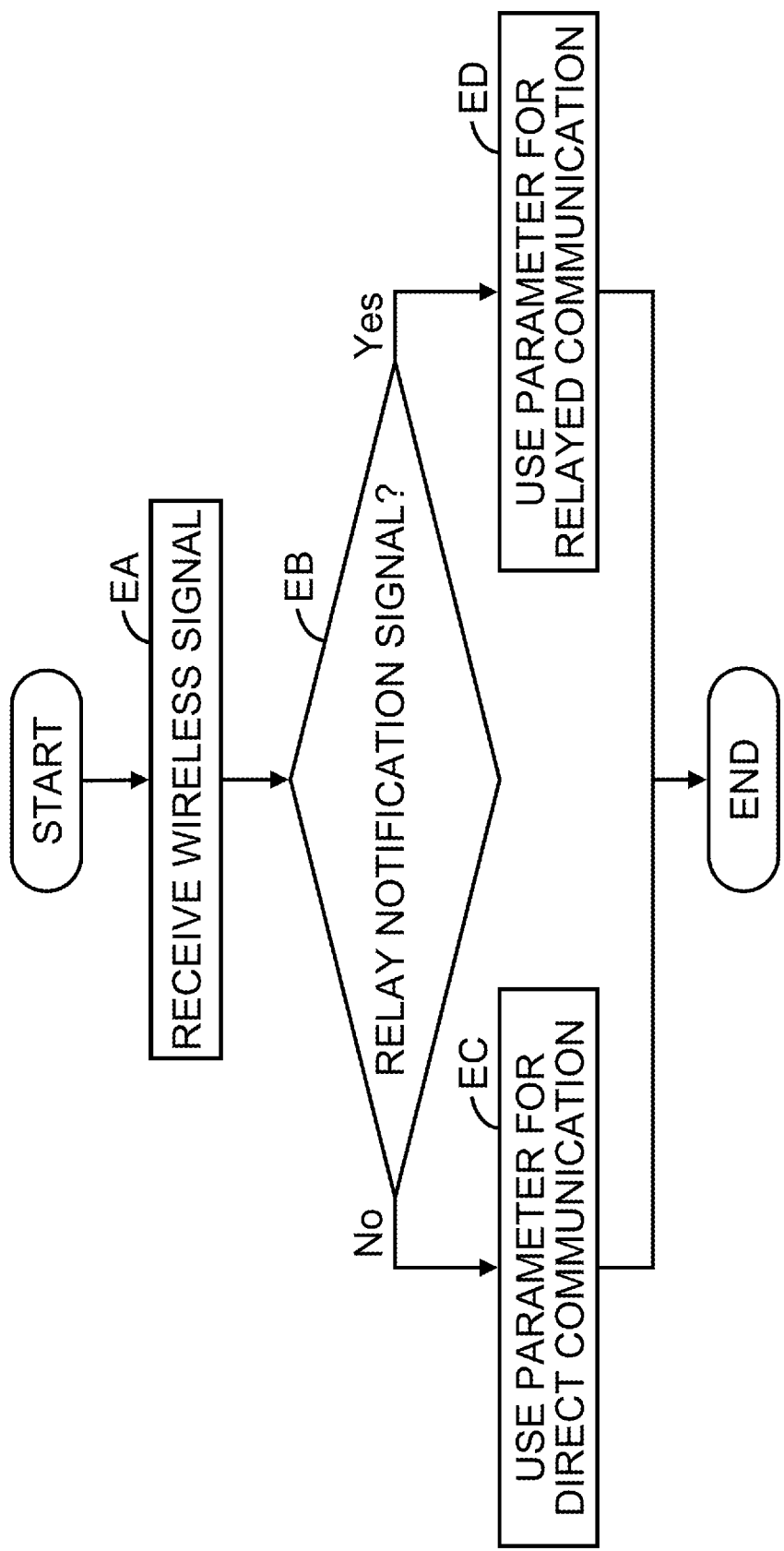
FIG. 14 is a diagram illustrating an example of an operation flow of a process performed by a wireless communication apparatus according to an embodiment of the present invention.

FIG. 14 illustrates an example of an operation flow of a process performed by the wireless communication apparatus 3 illustrated in FIG. 13.

In operation EA, the receiving section 31 receives an incoming wireless signal via the antenna 30.

In operation EB, the parameter changing section 33 determines whether the relay notification signal detecting section 32 has detected, from the received wireless signal, the relay notification signal transmitted from the wireless communication apparatus 2. When no relay notification signal has been detected ("No" in operation EB), the wireless communication apparatus 3 advances the process to operation EC. When the relay notification signal has been detected ("Yes" in operation EB), the wireless communication apparatus 3 advances the process to operation ED.

In operation EC, the parameter changing section 33 uses, as the communication parameter for wireless communication between the wireless communication apparatuses 2 and 3, a parameter used when the wireless communication apparatuses 2 and 3 directly communicate with each other. Thereafter, the wireless communication apparatus 3 terminates the process.

In operation ED, the parameter changing section 33 uses, as the communication parameter for wireless communication between the wireless communication apparatus 2, which is the transmission source of the relay notification signal, and the wireless communication apparatus 3, a parameter used when communication between the wireless communication apparatuses 2 and 3 is relayed. Thereafter, the wireless communication apparatus 3 terminates the process.

According to the present embodiment, the wireless communication apparatus 3 may change the communication parameter used in communication between the wireless communication apparatuses 2 and 3 in accordance with the result of detection, which has been performed by the wireless communication apparatus 2 at the receiving side, indicating whether communication from the wireless communication apparatus 3 to the wireless communication apparatus 2 has been relayed.

Figure 15:
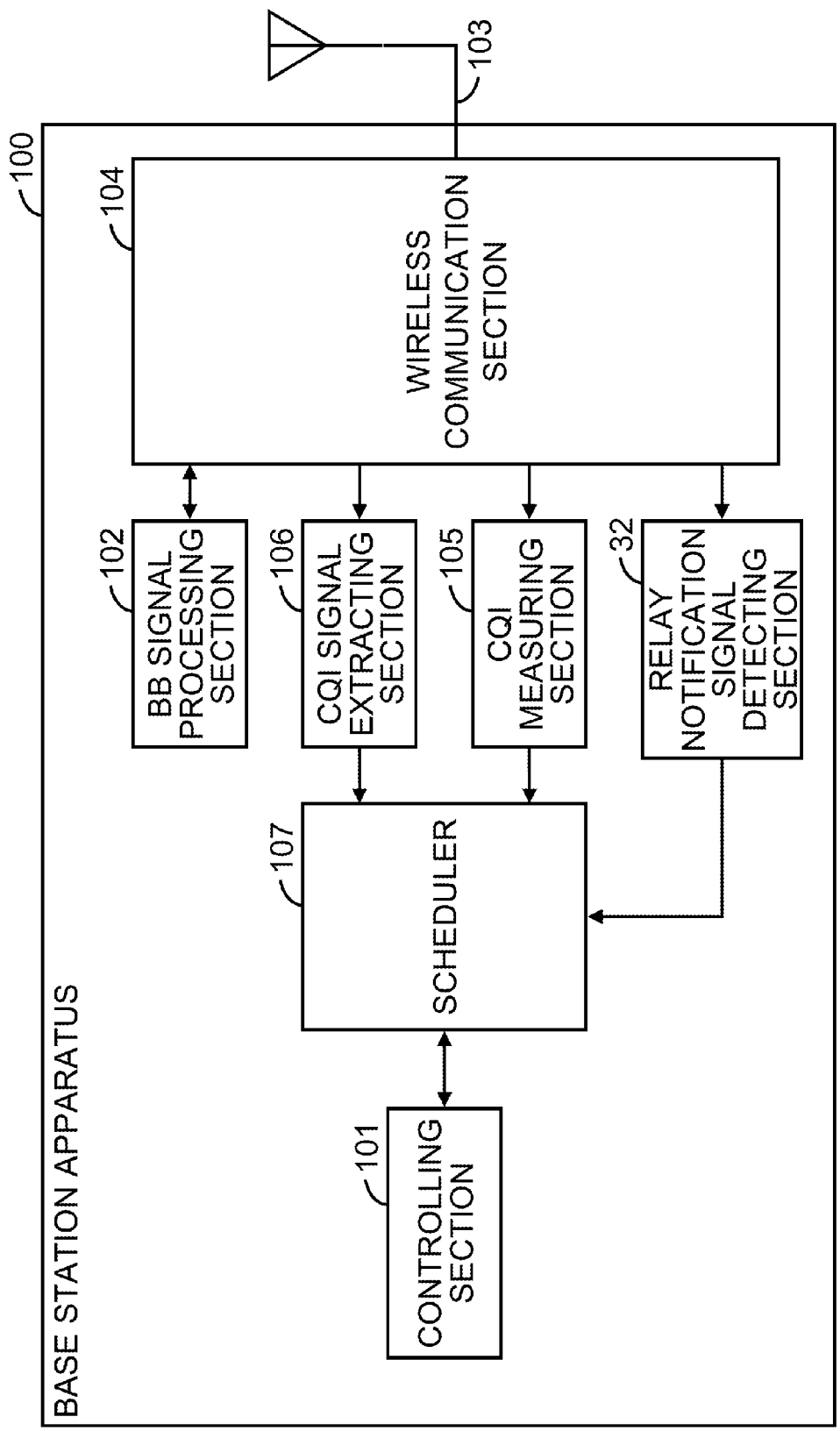
FIG. 15 is a diagram illustrating an example of a configuration of a base station apparatus serving as a wireless communication apparatus according to an embodiment of the present invention.

FIG. 15 illustrates an example of a configuration of a base station apparatus serving as the wireless communication apparatus 3 illustrated in FIG. 13. The difference from the example illustrated in FIG. 8 is that the base station apparatus 100 illustrated in FIG. 15 includes a relay notification signal detecting section 32 instead of the relay determining section 22. The base station apparatus 100 includes the controlling section 101, the baseband signal processing section 102, the antenna 103, and the wireless communication section 104. The base station apparatus 100 further includes the CQI measuring section 105, the CQI signal extracting section 106, the scheduler 107, and the relay notification signal detecting section 32.

The base station apparatus 100 receives the relay notification signal from a mobile station apparatus serving as the wireless communication apparatus 2 illustrated in FIG. 11. The relay notification signal detecting section 32 detects, from the wireless signal received by the wireless communication section 104, the relay notification signal transmitted from the mobile station apparatus. When the relay notification signal detecting section 32 has detected the relay notification signal, the scheduler 107 may restrict transmission power of the base station apparatus 100 to a certain upper limit or less.

When downlink wireless communication is relayed by the relay apparatus 10, it may be assumed that uplink wireless communication is also relayed by the relay apparatus 10. Therefore, when the relay notification signal detecting section 32 has detected the relay notification signal, the scheduler 107 may control transmission power in transmitting the signal from the mobile station apparatus by using a transmission power control signal so that transmission power in transmitting the signal from the mobile station apparatus using the uplink channel does not exceed a certain upper limit. When the relay notification signal detecting section 32 has detected the relay notification signal, the scheduler 107 may determine not to perform MIMO transmission with the mobile station apparatus.

According to the present embodiment, the communication parameter for communication in the downlink may be changed in accordance with the result of detection, which has been performed by the mobile station apparatus, indicating whether the signal transmitted in the downlink has been relayed. Also, the communication parameter for communication in an uplink may be changed in accordance with the result of detection, which has been performed by the mobile station apparatus, indicating whether the signal transmitted in the uplink has been relayed.

Figure 16:
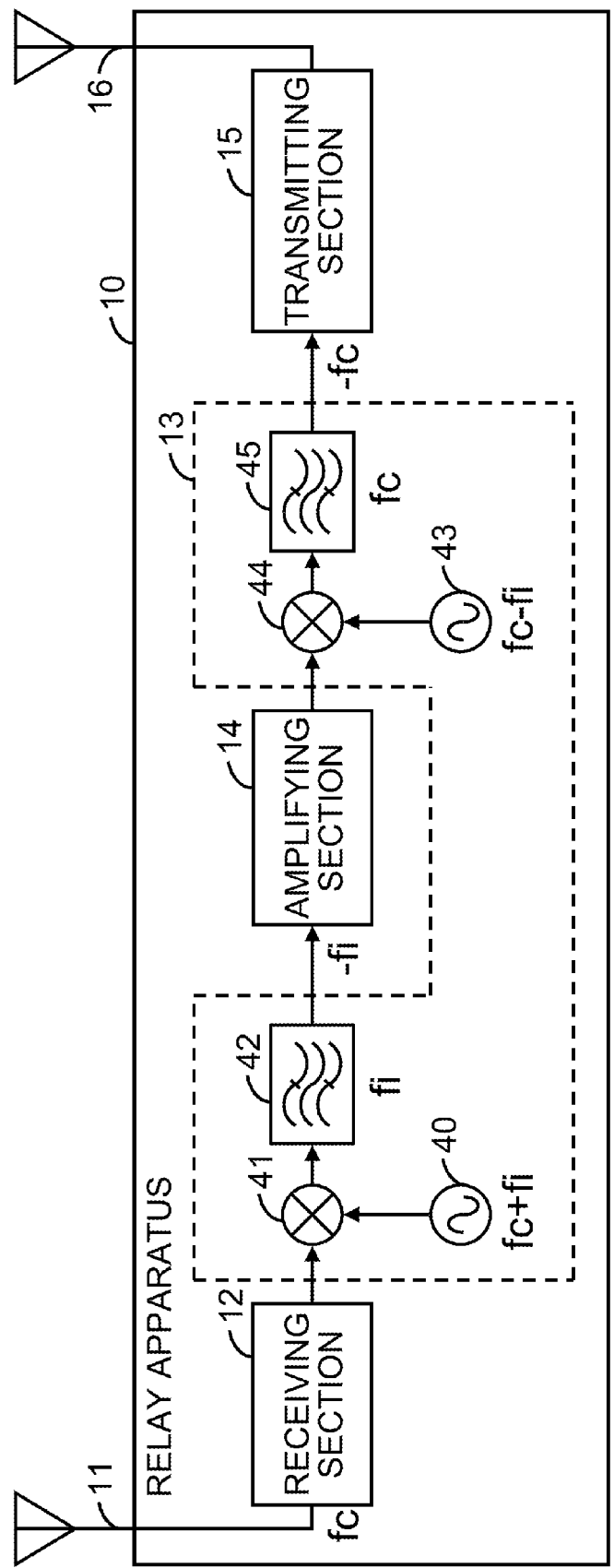
FIG. 16 is a diagram illustrating an example of a configuration of an advice information adding section of a relay apparatus according to an embodiment of the present invention.

Next, an embodiment of the advice information adding section 13 and an embodiment of the relay determining section 22 will be discussed. FIG. 16 illustrates a first example of a configuration of the advice information adding section 13 of the relay apparatus 10. The difference from the example illustrated in FIG. 2 is that local oscillators 40 and 43, multipliers 41 and 44, and band-pass filters 42 and 45 are illustrated as a detailed configuration of the advice information adding section 13.

The advice information adding section 13 adds, to the received wireless signal, information indicating that the received wireless signal has been relayed, by inverting the sign of the frequency of the received wireless signal, that is, by inverting the spectrum of the received wireless signal.

The frequency of the carrier wave of the wireless signal received by the relay apparatus 10 is denoted by "fc". The advice information adding section 13 may include a frequency converter and a band-pass filter. The frequency converter converts the received wireless signal into a signal including a frequency component "−fc" which has the same frequency as, but whose sign is different from, the frequency fc of the carrier wave of the received wireless signal. The band-pass filter extracts a frequency component with a frequency of "fc" from an output signal of the frequency converter.

In the example of the configuration illustrated in FIG. 16, the advice information adding section 13 includes, as the frequency converter, a first mixer including the local oscillator 40 and the multiplier 41, and a second mixer including the local oscillator 43 and the multiplier 44. The configuration illustrated in FIG. 16 is an example of the configuration of the frequency converter, and it is not intended to restrict the embodiment of the advice information adding section 13 to that discussed in the following discussion. The frequency converter may be realized in various configurations. The first mixer may be a part of the receiving section 12, and the second mixer may be a part of the transmitting section 15.

The frequency of an intermediate frequency signal amplified by the amplifying section 14 is denoted by "fi". The local oscillator 40 generates a local signal with a frequency of "fc+fi". The multiplier 41 multiplies the received wireless signal with a frequency of "fc" by the local signal output from the local oscillator 40, thereby converting the received wireless signal into a signal including a component with a frequency of "−fi" and a component with a frequency of "2fc+fi".

The pass band of the band-pass filter 42 is the intermediate frequency "fi". The band-pass filter 42 extracts, from the output signal of the multiplier 41, an intermediate frequency signal with the frequency of "−fi". The amplifying section 14 amplifies the intermediate frequency signal, and inputs the amplified signal to the multiplier 44.

The local oscillator 43 generates a local signal with a frequency of "fc−fi". The multiplier 44 multiplies the intermediate frequency signal with a frequency of "−fi" by the local signal output from the local oscillator 43, thereby converting the intermediate frequency signal into a signal including a component with a frequency of "−fc" and a component with a frequency of "fc−2fi".

The pass band of the band-pass filter 45 is the frequency "fc" of the carrier wave. The band-pass filter 45 extracts, from the output signal of the multiplier 44, a carrier signal with the frequency of "−fc". In this manner, the advice information adding section 13 inverts the sign of the frequency of the received wireless signal. The signal whose sign of the frequency has been inverted is transmitted by the transmitting section 15.

Figure 17:
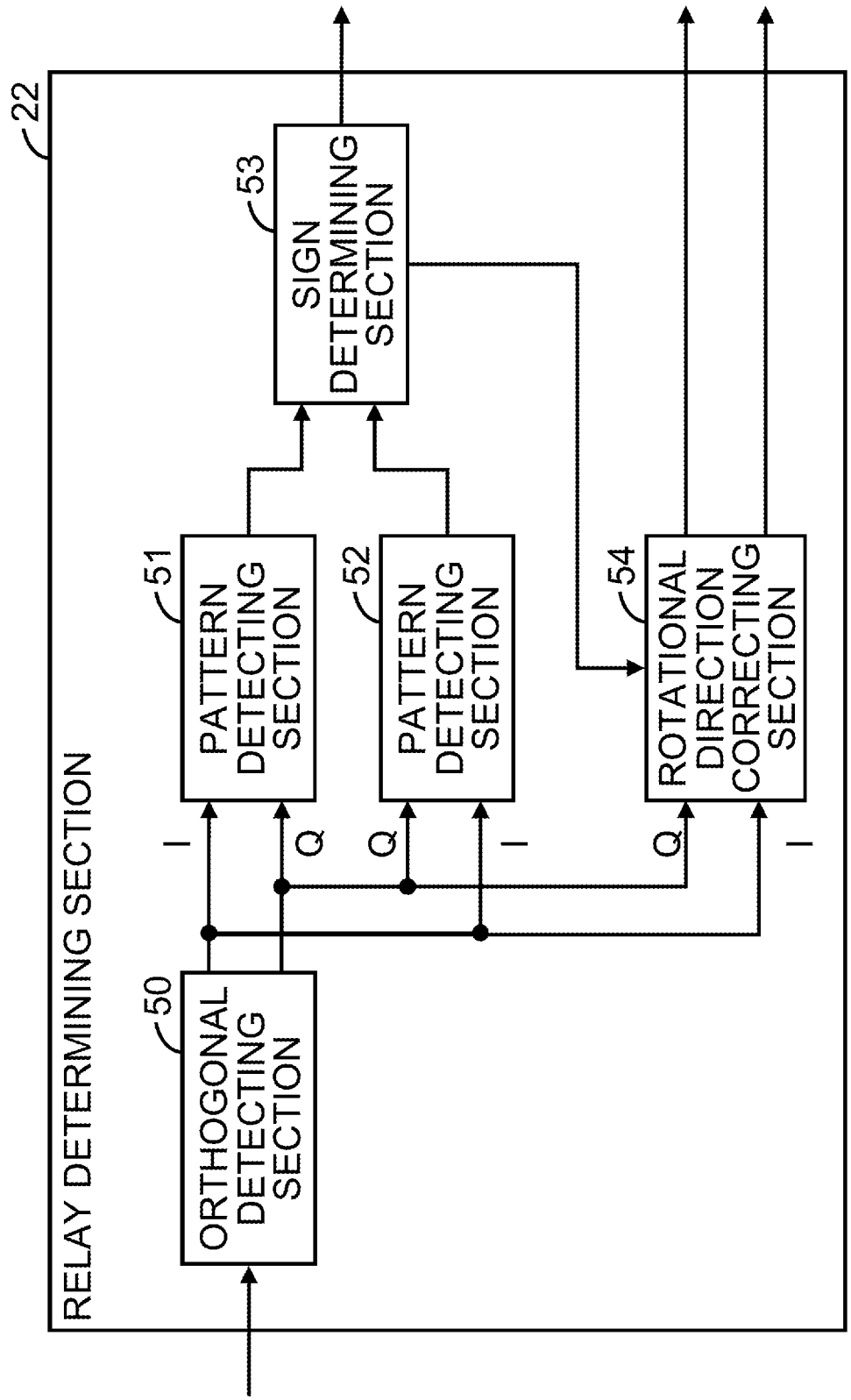
FIG. 17 is a diagram illustrating an example of a configuration of a relay determining section of a wireless communication apparatus according to an embodiment of the present invention.

FIG. 17 illustrates a first example of a configuration of the relay determining section 22. The relay determining section 22 determines whether the advice information has been added, to the received wireless signal received by the wireless communication apparatus 2, by the advice information adding section 13 illustrated in FIG. 16. The relay determining section 22 includes an orthogonal detecting section 50, pattern detecting sections 51 and 52, a sign determining section 53, and a rotational direction correcting section 54.

The orthogonal detecting section 50 applies orthogonal detection process to the received wireless signal received by the wireless communication apparatus 2, and generates an in-phase component signal (I component signal) and a quadrature-phase component signal (Q component signal). The pattern detecting section 51 calculates a correlation value between a certain pattern that is known to be included in the received wireless signal and a pattern of a symbol of a constellation point corresponding to the in-phase component signal and the quadrature-phase component signal output from the orthogonal detecting section 50. The pattern detecting section 51 may use, for example, a pilot signal or a reference signal as such a known pattern.

In contrast, the pattern detecting section 52 calculates a correlation value between the foregoing certain pattern and a pattern of a symbol corresponding to a signal obtained by inverting the rotational direction of the phase of the in-phase component signal and the quadrature-phase component signal output from the orthogonal detecting section 50.

In accordance with the correlation values calculated by the pattern detecting sections 51 and 52, the sign determining section 53 determines whether the sign of the frequency of the carrier wave of the received wireless signal received by the wireless communication apparatus 2 has been inverted, that is, whether the received wireless signal has been relayed.

When the correlation value calculated by the pattern detecting section 51 is greater than the correlation value calculated by the pattern detecting section 52, the sign determining section 53 determines that the sign of the frequency of the carrier wave of the received wireless signal has not been inverted. When the correlation value calculated by the pattern detecting section 51 is less than the correlation value calculated by the pattern detecting section 52, the sign determining section 53 determines that the sign of the frequency of the carrier wave of the received wireless signal has been inverted. The sign determining section 53 outputs a determination result signal indicating whether the received wireless signal has been relayed.

In accordance with the result of the determination performed by the sign determining section 53, the rotational direction correcting section 54 corrects the rotational direction of the phase of the in-phase component signal and the quadrature-phase component signal output by the orthogonal detecting section 50. When the sign of the frequency of the carrier wave of the received wireless signal has not been inverted, the rotational direction correcting section 54 simply outputs the in-phase component signal and the quadrature-phase component signal output by the orthogonal detecting section 50, without changing these signals. When the sign of the frequency of the carrier wave of the received wireless signal has been inverted, the rotational direction correcting section 54 inverts the rotational direction of the phase of the in-phase component signal and the quadrature-phase component signal output by the orthogonal detecting section 50, and outputs these signals.

The rotational direction correcting section 54 may invert the rotational direction of the phase of the in-phase component signal and the quadrature-phase component signal by, for example, exchanging the in-phase component and the quadrature-phase component of the input in-phase component signal and the input quadrature-phase component signal. Alternatively, the rotational direction correcting section 54 may invert the rotational direction of the phase of the in-phase component signal and the quadrature-phase component signal by, for example, inverting the value of either one of the input in-phase component signal and the input quadrature-phase component signal.

The in-phase component signal and the quadrature-phase component signal output from the rotational direction correcting section 54 are supplied to the demodulating section that demodulates the received wireless signal received by the wireless communication apparatus 2. For example, when the wireless communication apparatus 2 is the base station apparatus 100 illustrated in FIG. 8, the in-phase component signal and the quadrature-phase component signal output from the rotational direction correcting section 54 may be supplied to the demodulating section 108. Alternatively, for example, when the wireless communication apparatus 2 is the mobile station apparatus 200 illustrated in FIGS. 9 and 10, the in-phase component signal and the quadrature-phase component signal output from the rotational direction correcting section 54 may be supplied to the demodulating section 206.

According to the present embodiment, information indicating that the wireless signal has been relayed may be added to the relayed wireless signal by inverting or not inverting the sign of the frequency of the carrier wave of the wireless signal. Even when the sign of the frequency of the carrier wave is inverted, the wireless resources of the wireless signal are not consumed.

Figure 18:
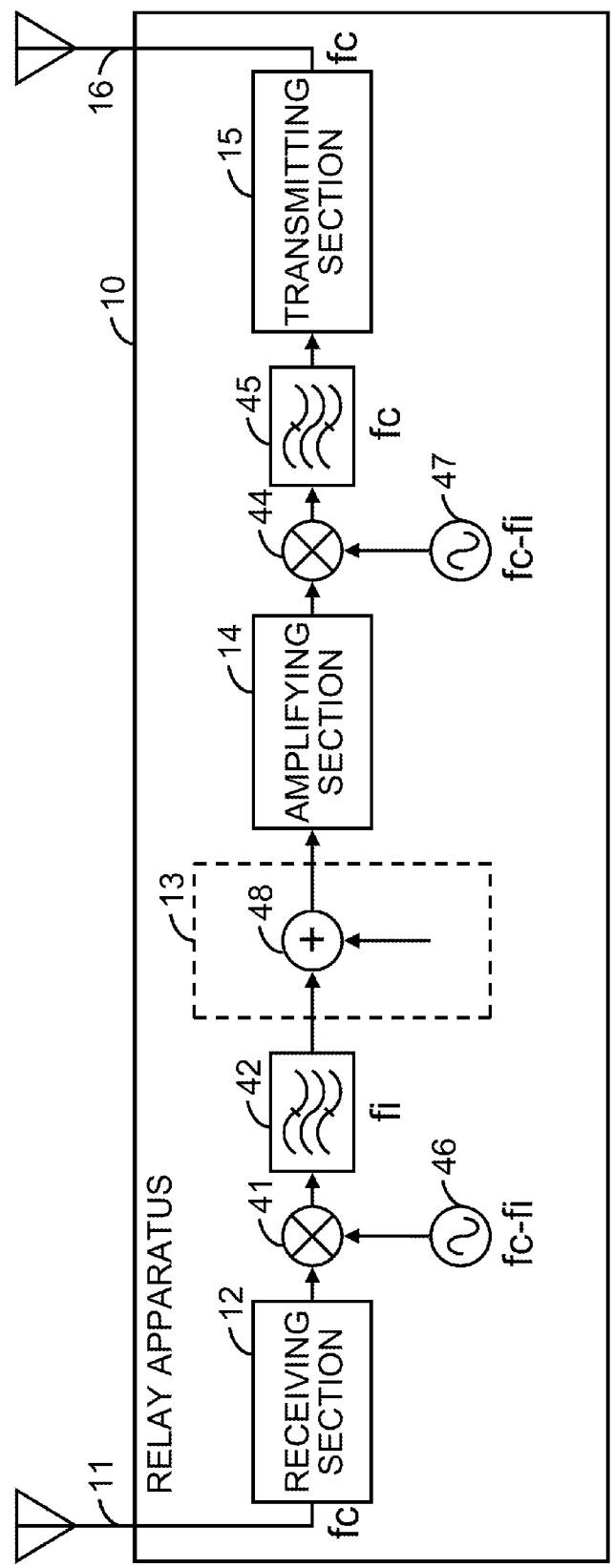
FIG. 18 is a diagram illustrating an example of a configuration of an advice information adding section of a relay apparatus according to an embodiment of the present invention.

FIG. 18 illustrates a second example of a configuration of the advice information adding section 13 of the relay apparatus 10. The difference from the first example illustrated in FIG. 16 is that the relay apparatus 10 illustrated in FIG. 18 includes local oscillators 46 and 47 instead of the local oscillators 40 and 43, and further includes a signal adder 48. The relay apparatus 10 includes the antennas 11 and 16, the receiving section 12, the advice information adding section 13, the amplifying section 14, the transmitting section 15, the local oscillators 46 and 47, the multipliers 41 and 44, and the band-pass filters 42 and 45. The advice information adding section 13 includes the signal adder 48.

The frequency of the carrier wave of the wireless signal received by the relay apparatus 10 is denoted by "fc". The frequency of an intermediate frequency signal amplified by the amplifying section 14 is denoted by "fi". The multiplier 41 multiplies the received wireless signal with a frequency of "fc" by the local signal with a frequency of "fc−fi" that has been generated by the local oscillator 46, thereby converting the received wireless signal into a signal including a component with a frequency of "fi" and a component with a frequency of "2fc−fi". The band-pass filter 42 extracts the intermediate frequency signal with the frequency of "fi" from the output signal of the multiplier 41.

The signal adder 48 adds an advice signal indicating that the received wireless signal has been relayed by a relay apparatus to the intermediate frequency signal extracted by the band-pass filter 42. The signal adder 48 may add the advice signal by multiplexing a certain pattern with the intermediate frequency signal. The signal adder 48 may multiplex an advice signal of a certain pattern within a frequency band that has a negligible effect on the main signal. Alternatively, the signal adder 48 may multiplex an advice signal of a certain pattern by code spreading.

The multiplier 44 multiplies the intermediate frequency signal, that includes the advice signal being multiplexed therewith, with a frequency of "fi" by a local signal, that has been generated by the local oscillator 47, with a frequency of "fc−fi", thereby converting the intermediate frequency signal into a signal including a component with a frequency of "fc" and a component with a frequency of "−fc+2fi". The band-pass filter 45 extracts the carrier signal with the frequency of "fc" from the output signal of the multiplier 44.

Figure 19:
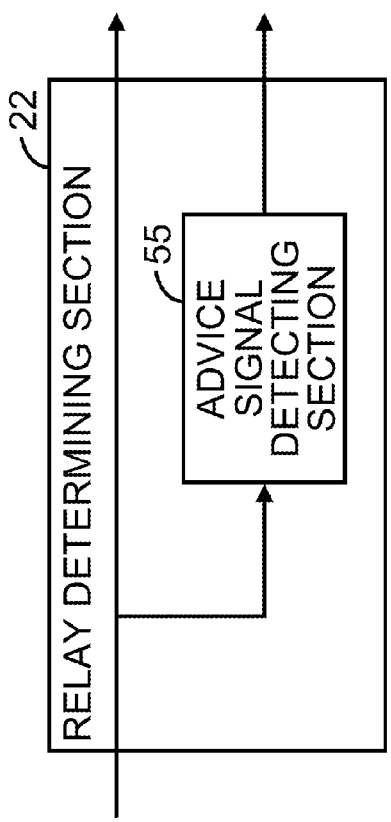
FIG. 19 is a diagram illustrating an example of a configuration of a relay determining section of a wireless communication apparatus according to an embodiment of the present invention.

FIG. 19 illustrates a second example of a configuration of the relay determining section 22. The relay determining section 22 determines whether the advice information, which indicates that the received wireless signal received by the wireless communication apparatus 2 has been relayed, has been added to the received wireless signal by the advice information adding section 13 illustrated in FIG. 18. The relay determining section 22 includes an advice signal detecting section 55.

The received wireless signal received by the wireless communication apparatus 2 is supplied to the advice signal detecting section 55 and the demodulating section that demodulates the received wireless signal received by the wireless communication apparatus 2, as it is or frequency-converted into the baseband frequency signal or the intermediate frequency signal. The demodulating section may be, for example, the demodulating section 108 illustrated in FIG. 8 or the demodulating section 206 illustrated in FIGS. 9 and 10.

The advice signal detecting section 55 detects whether the input received wireless signal includes the advice signal added by the signal adder 48 illustrated in FIG. 18. When the input received wireless signal includes the advice signal, the advice signal detecting section 55 determines that the received wireless signal has been relayed. When the input received wireless signal does not include the advice signal, the advice signal detecting section 55 determines that the received wireless signal has not been relayed. When the advice signal has been multiplexed with the received wireless signal in a spread state by code spreading, the advice signal detecting section 55 may determine whether the received wireless signal includes the advice signal by using a correlator that calculates correlation with the spread code.

According to the present embodiment, information indicating that the received wireless signal has been relayed may be added to the relayed signal.

Figure 20:
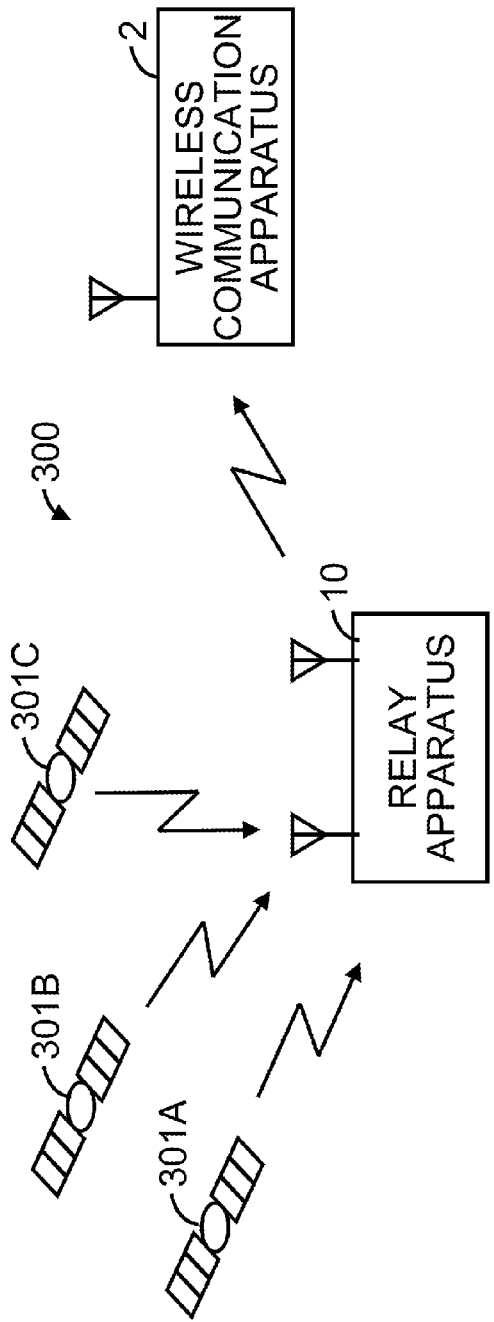
FIG. 20 is a diagram illustrating an example of a configuration of a communication system according to an embodiment of the present invention.

FIG. 20 illustrates an example of a configuration of a positioning system 300 as an example of a communication system according to the present embodiment. The positioning system 300 includes positioning signal transmitting apparatuses 301A to 301C, the relay apparatus 10, and the wireless communication apparatus 2. In the following discussion, the positioning signal transmitting apparatuses 301A to 301C may also be referred to as positioning signal transmitting apparatuses 301.

The wireless communication apparatus 2 measures a delay time of each of positioning signals transmitted from the positioning signal transmitting apparatuses 301 at different locations, and, in accordance with the distances from these positioning signal transmitting apparatuses 301, measures the position of the wireless communication apparatus 2. The positioning system 300 may be a global positioning system (GPS) or an advanced forward link trilateration (AFLT) system.

When the positioning system 300 is the GPS, the positioning signal transmitting apparatuses 301 are GPS satellites. When the positioning system 300 is the AFLT system, the positioning signal transmitting apparatuses 301 are base station apparatuses. The GPS and AFLT systems are examples of the positioning system 300, and the present discussion does not intended to restrict the embodiment of the positioning system 300 to these specific systems. The positioning system 300 may be any type of positioning system as long as it is a system that measures the position of a positioning target in accordance with a delay time of each of positioning signals received from multiple positioning signal transmitting apparatuses.

The relay apparatus 10 relays positioning signals transmitted from the positioning signal transmitting apparatuses 301. That is, the relay apparatus 10 amplifies and transmits wireless signals received from the positioning signal transmitting apparatuses 301. The configuration of the relay apparatus 10 may be similar to the foregoing configuration discussed with reference to FIG. 2.

The delay time that occurs to the positioning signal relayed by the relay apparatus is different from the delay time that occurs when the wireless communication apparatus 2 directly receives the positioning signal from one of the positioning signal transmitting apparatuses 301. Therefore, when the positioning signal is relayed by the relay apparatus, the measurement accuracy of the measurement result obtained by the wireless communication apparatus 2 is degraded. Thus, the wireless communication apparatus 2 discussed below determines whether the positioning signal has been relayed.

Figure 21:
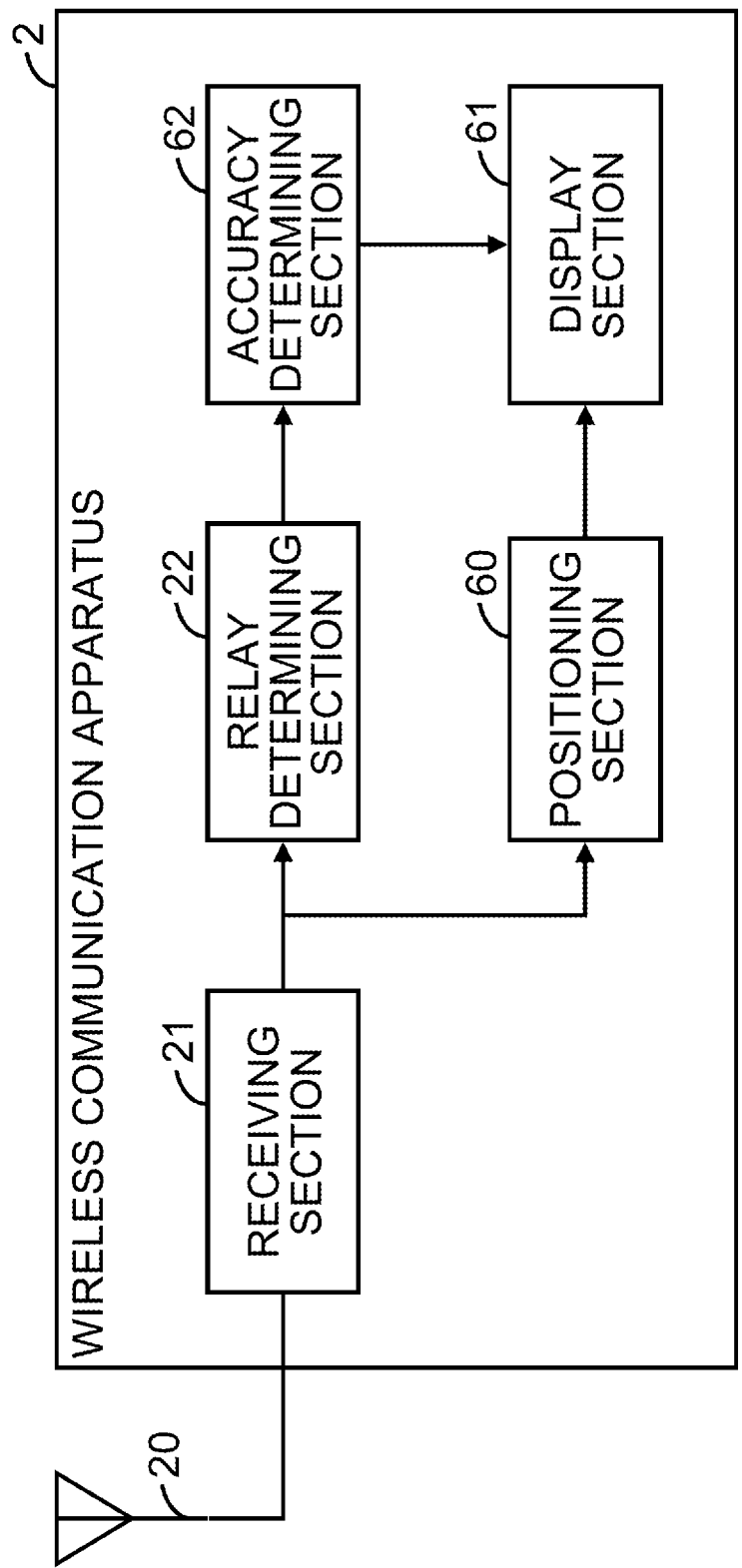
FIG. 21 is a diagram illustrating an example of a configuration of a wireless communication apparatus according to an embodiment of the present invention.

FIG. 21 illustrates an example of a configuration of the wireless communication apparatus 2 illustrated in FIG. 20. The difference from the example illustrated in FIG. 4 is that the wireless communication apparatus 2 illustrated in FIG. 21 further includes a positioning section 60, a display section 61, and an accuracy determining section 62. The wireless communication apparatus 2 includes the antenna 20, the receiving section 21, the relay determining section 22, the positioning section 60, the display section 61, and the accuracy determining section 62.

The positioning section 60 measures the position of the wireless communication apparatus 2 in accordance with a delay time of each of the positioning signals received by the receiving section 21 from the positioning signal transmitting apparatuses 301. The display section 61 outputs the result of the measurement of the position of the wireless communication apparatus 2 in a form that the user of the wireless communication apparatus 2 may view and recognize.

The accuracy determining section 62 receives the determination result signal from the relay determining section 22. The accuracy determining section 62 determines whether the accuracy of positioning performed by the positioning section 60 is good or poor, in accordance with whether the positioning signals have been relayed. That is, when the positioning signals have not been relayed, the accuracy determining section 62 determines that the accuracy of positioning performed by the positioning section 60 is normal. When the positioning signals have been relayed, the accuracy determining section 62 determines that the accuracy of positioning performed by the positioning section 60 may be poor.

The result of the determination performed by the accuracy determining section 62 is presented to the user by using the display section 61. The display section 61 may output the result of the determination in a form that indicates whether the accuracy is good or poor. Alternatively, when the positioning signals have been relayed, a warning that indicates that the positioning signals have been relayed may be simply output.

Figure 22:
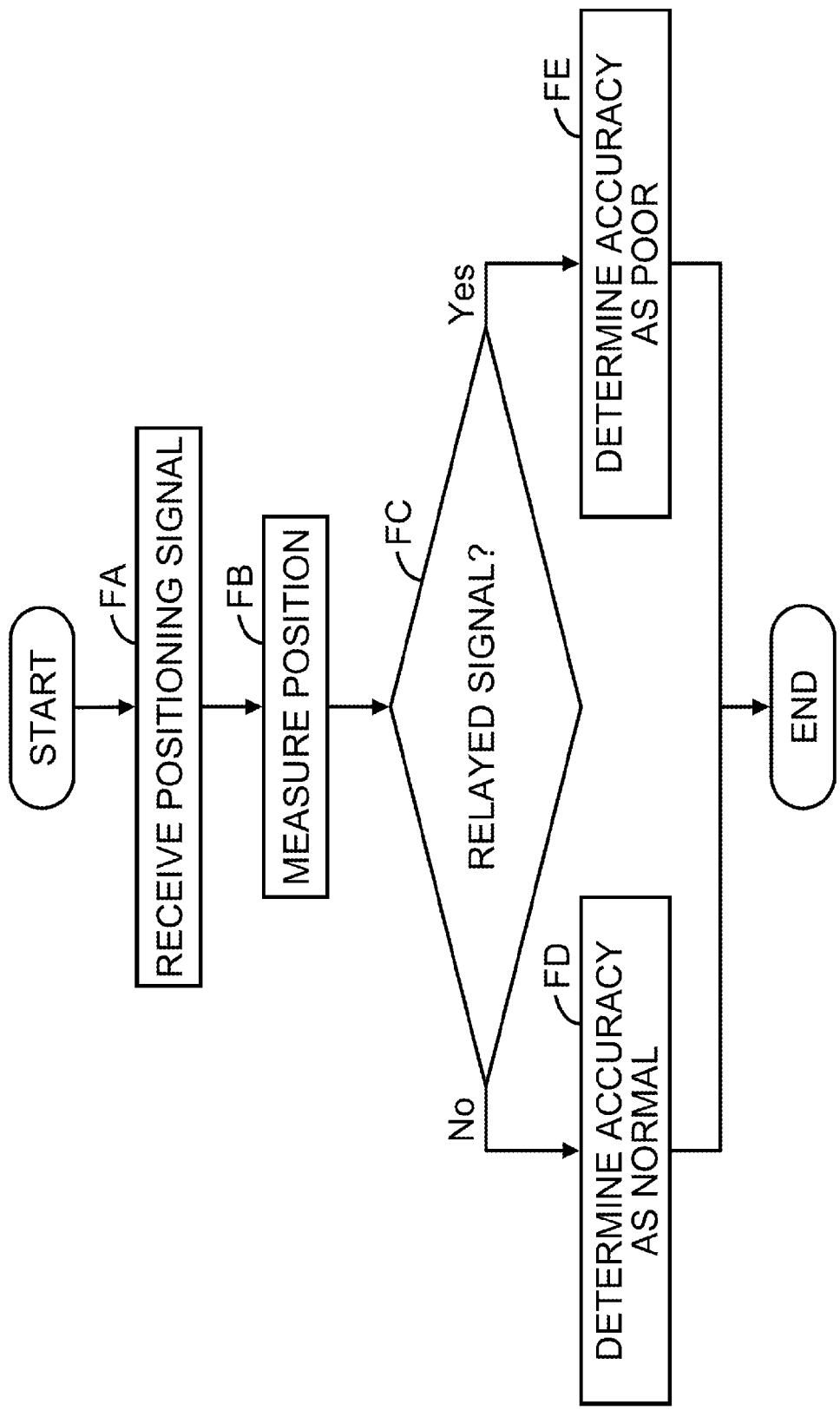
FIG. 22 is a diagram illustrating an example of an operation flow of a process performed by a wireless communication apparatus according to an embodiment of the present invention.

FIG. 22 illustrates an example of an operation flow of a process performed by the wireless communication apparatus 2 illustrated in FIG. 21.

In operation FA, the receiving section 21 receives an incoming positioning signal via the antenna 20.

In operation FB, the positioning section 60 measures the position of the wireless communication apparatus 2 in accordance with a delay time of each of the positioning signals received by the receiving section 21 from the positioning signal transmitting apparatuses 301. The display section 61 outputs the result of the positioning of the wireless communication apparatus 2 in a form that the user of the wireless communication apparatus 2 may view and recognize.

In operation FC, the relay determining section 22 determines whether the positioning signals received in operation FA have been relayed. When the positioning signals have not been relayed ("No" in operation FC), the wireless communication apparatus 2 advances the process to operation FD. When the positioning signals have been relayed ("Yes" in operation FC), the wireless communication apparatus 2 advances the process to operation FE.

In operation FD, the accuracy determining section 62 determines that the accuracy of positioning performed by the positioning section 60 is normal. The display section 61 outputs the result of the determination performed by the accuracy determining section 62. Thereafter, the wireless communication apparatus 2 terminates the process.

In operation FE, the accuracy determining section 62 determines that the accuracy of positioning performed by the positioning section 60 may be poor. The display section 61 outputs the result of the determination performed by the accuracy determining section 62. Thereafter, the wireless communication apparatus 2 terminates the process.

According to the present embodiment, whether the accuracy of the measurement result is good or poor may be determined in accordance with whether positioning signals received by the wireless communication apparatus 2 in the positioning system 300 have been relayed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A wireless communication method executed by a wireless communication system including a relay apparatus, a first wireless communication apparatus, and a second wireless communication apparatus, the wireless communication method comprising:
adding, by the relay apparatus upon receiving a wireless signal from the first wireless communication apparatus, advice information to the received wireless signal, the advice information indicating that the wireless signal has been relayed;
transmitting, by the relay apparatus, the wireless signal added the advice information thereto to the second wireless communication apparatus;
detecting, by the second wireless communication apparatus, the advice information to determine whether the wireless signal has been relayed; and
changing, by the second wireless communication apparatus, a communication parameter for wireless communication between the second wireless communication apparatus and the first wireless communication apparatus in accordance with whether the wireless signal has been relayed.

2. The wireless communication method according to claim 1, further comprising:
notifying, by the second wireless communication apparatus, the first wireless communication apparatus that the wireless signal has been relayed; and
changing, by the first wireless communication apparatus, a communication parameter for wireless communication between the second wireless communication apparatus and the first wireless communication apparatus in accordance with whether the wireless signal has been relayed.

3. The wireless communication method according to claim 1, the wireless signal being a positioning signal, the wireless communication method further comprising:
determining, by the second wireless communication apparatus, an accuracy of positioning based on the positioning signal in accordance with whether the wireless signal has been relayed.

4. The wireless communication method according to claim 1, wherein
the relay apparatus adds the advice information by inverting a sign of a frequency of the wireless signal.

5. The wireless communication method according to claim 1, wherein
the relay apparatus adds predetermined advice information to the wireless signal.

6. A relay apparatus for relaying a wireless signal, the relay apparatus comprising:
a receiving section configured to receive the wireless signal;
an amplifying section configured to amplifying the received wireless signal;
a transmitting section configured to transmitting the amplified wireless signal; and
an advice information adding section configured to add, to the wireless signal, advice information indicating that the wireless signal has been relayed; wherein
the advice information adding section adds the advice information by inverting a sign of a frequency of the wireless signal.

7. The relay apparatus according to claim 6, wherein
the advice information adding section adds predetermined advice information to the wireless signal.

8. A communication system, comprising:
a relay apparatus configured to relay a wireless signal transmitting from a source communication apparatus, the relay apparatus including:
a first receiving section configured to receive the wireless signal,
an amplifying section configured to amplifying the received wireless signal,
a transmitting section configured to transmitting the amplified wireless signal, and
an advice information adding section configured to add, to the wireless signal, advice information indicating that the wireless signal has been relayed; and
a wireless communication apparatus configured to communicate with the source communication apparatus, the wireless communication apparatus including:
a second receiving section configured to receive the wireless signal, and a relay determining section configured to detect the advice information from the received wireless signal received by the second receiving section to determine whether the received wireless signal received by the second receiving section has been relayed; wherein
the advice information adding section adds the advice information by inverting a sign of a frequency of the wireless signal.

* * * * *